United States Patent
Makani et al.

(10) Patent No.: US 12,353,488 B2
(45) Date of Patent: *Jul. 8, 2025

(54) SYSTEM AND METHOD FOR PROVIDING ENHANCED RECOMMENDATIONS BASED ON THIRD-PARTY OPINIONS

(71) Applicant: Match Group Americas, LLC, Dallas, TX (US)

(72) Inventors: Rahim Sherali Makani, Dallas, TX (US); John Masten Mitchell, Dallas, TX (US); Kenneth Basil Hoskins, Plano, TX (US)

(73) Assignee: Match Group Americas, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,981

(22) Filed: Dec. 20, 2022

(65) Prior Publication Data

US 2023/0334105 A1 Oct. 19, 2023

Related U.S. Application Data

(63) Continuation of application No. 16/746,685, filed on Jan. 17, 2020, now Pat. No. 11,537,673.

(51) Int. Cl.
*G06F 16/9535* (2019.01)
*G06F 3/0482* (2013.01)
(Continued)

(52) U.S. Cl.
CPC ........ *G06F 16/9535* (2019.01); *G06F 3/0482* (2013.01); *G06F 16/24578* (2019.01);
(Continued)

(58) Field of Classification Search
CPC .......... G06F 16/9535; G06F 16/24578; G06F 3/0482; H04L 67/306; H04L 51/046; H04L 51/10; H04L 51/32
See application file for complete search history.

(56) References Cited

U.S. PATENT DOCUMENTS 7,085,806 B1 8/2006 Shapira
9,094,360 B1 7/2015 Ashok
(Continued)

FOREIGN PATENT DOCUMENTS

GB 2397400 A 7/2004
JP 2015510622 A 4/2015
(Continued)

OTHER PUBLICATIONS

European Search Report issued for International application No. 21741273.3-1213/ 4091120 PCT/US2021012137—May 26, 2023.
(Continued)

*Primary Examiner* — Ken Hoang
(74) *Attorney, Agent, or Firm* — Baker Botts L.L.P.

(57) ABSTRACT

An apparatus includes an interface and a processor. The interface sends and receives data over a network. The processor uses the interface to transmit a first series of profiles to a first user. The first series of profiles corresponds to recommendations of users for a second user. The processor also uses the interface to receive a selection from the first user of a first profile of the first series of profiles. In response to receiving the selection from the first user of the first profile of the first series of profiles, the processor determines, based at least in part on the selection from the first user of the first profile, a second series of profiles. The processor additionally uses the interface to transmit the second series of profiles to the second user.

20 Claims, 13 Drawing Sheets

(51) Int. Cl.
*G06F 16/2457* (2019.01)
*H04L 67/306* (2022.01)
*H04L 51/046* (2022.01)
*H04L 51/10* (2022.01)
*H04L 51/52* (2022.01)

(52) U.S. Cl.
CPC .......... *H04L 67/306* (2013.01); *H04L 51/046* (2013.01); *H04L 51/10* (2013.01); *H04L 51/52* (2022.05)

(56) References Cited

U.S. PATENT DOCUMENTS

| | | | |
|---|---|---|---|
| 10,943,243 B2* | 3/2021 | Herbst | G06Q 50/10 |
| 2007/0143128 A1* | 6/2007 | Tokarev | G06Q 30/0282 705/347 |
| 2008/0235071 A1 | 9/2008 | Gutta et al. | |
| 2011/0153669 A1 | 6/2011 | Villa et al. | |
| 2014/0074824 A1 | 3/2014 | Rad | |
| 2014/0279066 A1 | 9/2014 | Louis et al. | |
| 2015/0242967 A1 | 8/2015 | Shsh | |
| 2017/0124093 A1 | 5/2017 | Carbonell et al. | |
| 2018/0130139 A1 | 5/2018 | Hurley | |
| 2019/0362440 A1 | 11/2019 | Williams | |
| 2021/0109938 A1 | 4/2021 | LaPoff et al. | |

FOREIGN PATENT DOCUMENTS

| | | |
|---|---|---|
| JP | 2018512085 A | 2/2019 |
| KR | 100908613 B1 | 7/2009 |
| KR | 20160086679 A | 7/2016 |
| KR | 101662531 B1 | 10/2016 |
| KR | 20120030916 A | 2/2017 |
| KR | 20170019948 A | 3/2018 |
| WO | 2018 227823 A1 | 12/2018 |

OTHER PUBLICATIONS

PCT Notification of Transmittal of the International Search Report and the Written Opinion of the International Searching Authority, or the Declaration issued for International application No. PCT/US2021/012137—Apr. 29, 2021.
Wingman; http://www.wingmanapp.com (2018).
Vouch; https://www.tryvouchapp.com (2018).
Australian Government, Examination Report No. 1 for Application No. 2021207780, report date Nov. 20, 2024.
European Examination Report corresponding to European Application No. 21741273.3 dated Sep. 2, 2024, 5 pages.
Japan Patent Office, Application 2022-543385, Notice of Reason for Rejection, Apr. 9, 2024. [English Translation].
Australian Examiners Report corresponding to Australian Patent Application No. 2021207780, dated Mar. 13, 2025, 4 pages.

* cited by examiner

SYSTEM AND METHOD FOR PROVIDING ENHANCED RECOMMENDATIONS BASED ON THIRD-PARTY OPINIONS

PRIORITY

This application is a continuation, under 35 U.S.C. § 120, of U.S. patent application Ser. No. 16/746,685 filed on Jan. 17, 2020 which is hereby incorporated by reference in its entirety.

TECHNICAL FIELD

This invention relates generally to the field of communications and, more particularly, to a system and method for providing enhanced recommendations based on third-party opinions.

BACKGROUND

Networking architectures, developed in communications environments, have grown increasingly complex in recent years. A multitude of protocols and configurations have been developed to accommodate a diverse group of end users having various networking needs. Many of these architectures have gained significant notoriety because they can offer the benefits of automation, convenience, management, and enhanced consumer selections. Using computing platforms with the networking architectures has allowed for increased communication, collaboration, and/or interaction. For example, certain network protocols may be used to allow an end user to connect online with other users who satisfy certain search requirements. These protocols may relate to job searches, person finding services, real estate searches, or online dating.

SUMMARY

This disclosure contemplates a matching tool that is designed to enable both singles and those in relationships to participate in the online-matching process. Users of the matching tool may register as either single, or in a relationship. Users who register as single may participate in the full experience offered by the matching tool, while users who register as in a relationship may participate in the matching process by attempting to generate matches for their single friends and/or by providing suggestions to their single friends. Certain embodiments of the matching tool are described below.

According to one embodiment, an apparatus includes an interface and a hardware processor communicatively coupled to the interface. The interface sends and receives data over a network. The hardware processor uses the interface to transmit a first series of profiles to a first user. The first series of profiles includes recommended profiles for a second user. The processor also uses the interface to receive a selection from the first user of a profile corresponding to a third user. The processor additionally uses the interface to transmit a second series of profiles to the third user. The second series of profiles includes recommended profiles for the third user. The processor further uses the interface to receive a selection from the third user of a profile corresponding to the second user. In response to receiving the selection from the first user of the profile corresponding to the third user and receiving the selection from the third user of the profile corresponding to the second user of the profile corresponding to the second user, the processor enables communication between the second user and the third user.

According to another embodiment, a method includes transmitting a first series of profiles to a first user. The first series of profiles includes recommended profiles for a second user. The method also includes receiving a selection from the first user of a profile corresponding to a third user. The method additionally includes transmitting a second series of profiles to the third user. The second series of profiles includes recommended profiles for the third user. The method further includes receiving a selection from the third user of a profile corresponding to the second user. In response to receiving the selection from the first user of the profile corresponding to the third user and receiving the selection from the third user of the profile corresponding to the second user, the method includes enabling communication between the second user and the third user.

According to another embodiment, at least one computer-readable medium includes a plurality of instructions that, when executed by at least one processor, causes the at least one processor to transmit a first series of profiles to a first user. The first series of profiles include recommended profiles for a second user. When executed by the at least one processor, the plurality of instructions also causes the at least one processor to receive a selection from the first user of a profile corresponding to a third user. When executed by the at least one processor, the plurality of instructions additionally causes the at least one processor to transmit a second series of profiles to the third user. The second series of profiles includes recommended profiles for the third user. When executed by the at least one processor, the plurality of instructions further causes the at least one processor to receive a selection from the third user of a profile corresponding to the second user. When executed by the at least one processor, the plurality of instructions also causes the at least one processor to determine that the second user has authorized the first user to select profiles on behalf of the second user. In response to causing the at least one processor to receive the selection from the first user of the profile corresponding to the third user, receive the selection from the third user of the profile corresponding to the second user, and determine that the second user has authorized the first user to select profiles on behalf of the second user, when executed by the at least one processor, the plurality of instructions additionally cause the processor to enable communication between the second user and the third user.

According to another embodiment, an apparatus includes an interface and a hardware processor communicatively coupled to the interface. The interface sends and receives data over a network. The hardware processor uses the interface to transmit a first series of profiles to a first user. The first series of profiles corresponds to recommendations of users for a second user. The processor also uses the interface to receive a selection from the first user of a first profile of the first series of profiles. In response to receiving the selection from the first user of the first profile of the first series of profiles, the processor determines, based at least in part on the selection from the first user of the first profile, a second series of profiles. The processor additionally uses the interface to transmit the second series of profiles to the second user.

According to yet another embodiment, a method includes transmitting a first series of profiles to a first user. The first series of profiles corresponds to recommendations of users for a second user. The method also includes receiving a selection from the first user of a first profile of the first series of profiles. In response to receiving the selection from the first user of the first profile of the first series of profiles, the method includes determining, based at least in part on the selection from the first user of the first profile, a second series of profiles. The method further includes transmitting the second series of profiles to the second user.

According to a further embodiment, at least one computer-readable medium includes a plurality of instructions that, when executed by at least one processor, causes the at least one processor to transmit a first series of profiles to a first user. The first series of profiles corresponds to recommendations of users for a second user. When executed by the at least one processor, the plurality of instructions also causes the at least one processor to receive a selection from the first user of a first profile of the first series of profiles. In response to causing the at least one processor to receive the selection from the first user of the first profile of the first series of profiles, when executed by the at least one processor, the plurality of instructions additionally causes the at least one processor to determine, based at least in part on a first weight assigned to the first user and the selection from the first user of the first profile, a second series of profiles corresponding to recommendations of users for the second user. When executed by the at least one processor, the plurality of instructions further causes the at least one processor to transmit the second series of profiles to the second user. In response to causing the at least one processor to transmit the second series of profiles to the second user, when executed by the at least one processor, the plurality of instructions also causes the at least one processor to receive a selection from the second user of a profile of the second series of profiles. In response to causing the at least one processor to receive the selection from the second user of the profile of the second series of profiles, when executed by the at least one processor, the plurality of instructions additionally causes the at least one processor to determine, based at least in part on a second weight assigned to the second user and the selection from the second user of the profile of the second series of profiles, a third series of profiles corresponding to recommendations of users for the second user. When executed by the at least one processor, the plurality of instructions further causes the at least on processor to transmit the third series of profiles to the second user.

Certain embodiments provide one or more technical advantages. For example, an embodiment dynamically updates the profiles recommended to a user based on activity of the user as well as activity of the user's friends, acting on behalf of the user. As another example, an embodiment provides enhanced recommendations for a user by considering not only the user's preferences but also the preferences of the user's friends, acting on behalf of the user. In this manner, certain embodiments may decrease the processing and bandwidth resources expended by the system in providing recommendations to a user, prior to the user matching with and forming a successful relationship with another user offline. As a further example, an embodiment enables a user's friend to provide recommendations for the user and/or select profiles on behalf of the user without downloading an application or registering with the matching system, by providing the friend access to the system through a rich media component embedded in a text message. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
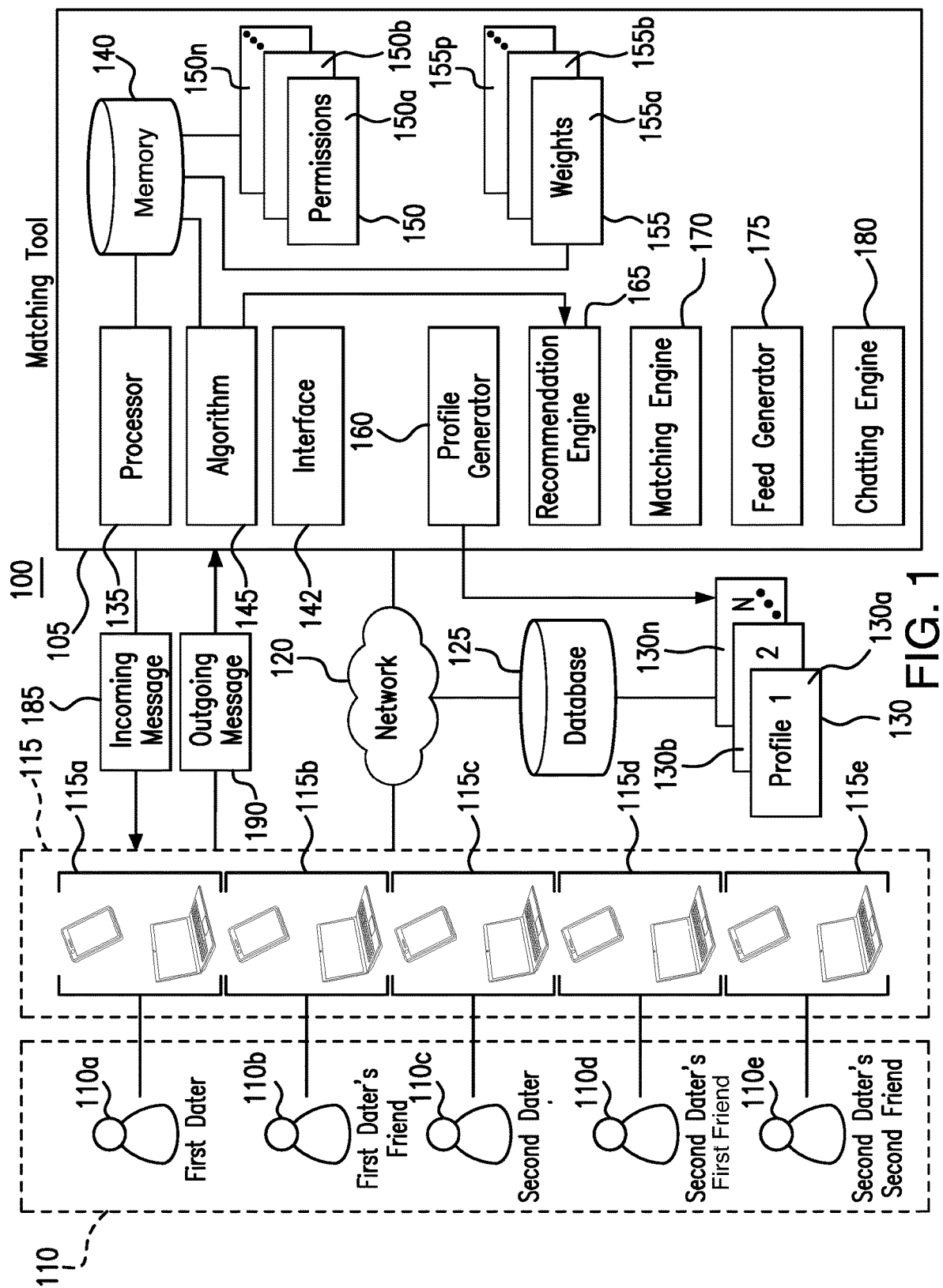
FIG. 1 illustrates an example system.

Embodiments of the present disclosure and its advantages may be understood by referring to FIGS. 1 through 8 of the drawings, like numerals being used for like and corresponding parts of the various drawings.

In a typical online-matching system, profiles that include particular sets of attributes related to participants in the system may be used to facilitate matching. As an example, in the online dating context, the profiles might include attributes such as age, education, and interests. Typical online-matching systems may use such attributes to identify pairs of potentially compatible daters and to recommend such daters to one another. For example, a typical online-matching system might generate recommendations by comparing various attributes from each dater's profile, to compute algorithmic estimates of compatibility scores between pairs of daters. As another example, an online-matching system may generate recommendations of potentially compatible profiles for a dater based on the similarity of the recommended profiles to those profiles previously recommended to the dater and for which the dater has indicated a preference.

While conventional online-matching systems may rely on a number of different algorithms to generate recommendations, a common feature of such systems lies in the fact that the daters themselves are ultimately responsible for selecting matches from among the presented recommendations. For example, a conventional matching system will only match a first dater with a second dater if both the first dater indicates a positive preference for the second dater and the second dater indicates a positive preference for the first dater.

However, in the real world, individuals in long-term relationships frequently participate in the dating lives of their single friends. For example, individuals in relationships often set up their single friends on blind dates, and singles often consult their friends for opinions on dating prospects. Indeed, singles may even attempt to include their non-single friends in conventional online dating experiences, by sharing screen captures of profile pictures they have viewed in a conventional online dating system with their non-single friends, outside of the online-matching system.

Accordingly, this disclosure contemplates a matching tool that adds to the experience provided by conventional online-matching systems by enabling both singles and those in relationships to participate in the online-matching process. Users of the matching tool may register as either single, or in a relationship. Users who register as single may participate in the full experience offered by the matching tool. This includes receiving profile recommendations, selecting profiles to match with, and chatting with matches, among other activities. A single user may also invite other users, such as those registered as in a relationship, to connect with the single user, thereby becoming his/her friends within the tool. The single user may then grant his/her friends various permissions, including, for example, the permission to select profiles on the single user's behalf, the permission to chat with potential matches on the single user's behalf, and/or the permission to edit the single user's profile, among others. In certain embodiments, a user may grant his/her friends friend-specific permissions. For example, the user may assign a first set of permissions to a first friend and a second set of permissions to a second friend, where the second set of permissions may be different from the first set of permissions. In some embodiments, a user may assign his/her friends to a team or group, and then set group-specific permissions for the team/group. For example, the user may assign each of his/her friends to a group and then assign a single set of permissions to every member of the group. A user who registers with the tool as "in a relationship" may connect with multiple single friends and may participate in the online-matching system according to the permissions set by his/her single friends. For example, a user who registers with the tool as "in a relationship" may participate in the online-matching system by attempting to generate matches for his/her single friends and/or providing suggestions of profiles to his/her single friends.

FIG. 1 illustrates an example system 100. As seen in FIG. 1, system 100 includes matching tool 105, user(s) 110, device(s) 115, network 120, and database 125. As used throughout this disclosure, each user of users 110a through 110e may correspond to a user who is acting as a dater, a friend of a dater, or both a dater and a friend of one or more other daters. Accordingly, when discussing actions performed by a given user 110a, this disclosure refers to the role of user 110a at the time user 110a performed each action. For example, this disclosure will refer to user 110a as dater 110a when user 110a is seeking matches for him/herself, communicating with potential matches, and/or performing any other actions associated with a dater. As another example, this disclosure will refer to user 110a as friend 110a when user 110a is performing actions on behalf of a single friend. Such references to specific roles of users 110 are in no way meant to limit the potential roles of users 110. While this disclosure contemplates any number of users 110, acting as daters and/or friends of daters, for simplicity, FIG. 1 illustrates users 110 as including first dater 110a, first friend 110b of first dater 110a, second dater 110c, first friend 110d of second dater 110c, and second friend 110e of second dater 110c.

Generally, matching tool 105 generates recommendations for first dater 110a and second dater 110c, consisting of profiles 130 of other, potentially compatible daters, and transmits such recommendations to the daters and their registered friends, for selection therefrom. In this manner matching tool 105 enables both daters 110a and 110c as well as friends 110b, 110d, and 110e to participate in the online dating process for daters 110a and 110c.

As an example, consider dater 110a. Matching tool 105 generates recommendations of other, potentially compatible daters, and presents a series of profiles 130 belonging to the potentially compatible daters to dater 110a and/or friend 110b of dater 110a for selection therefrom. For example, in certain embodiments, friend 110b may receive a series of recommendations for first dater 110a that includes profile 130c belonging to second dater 110c. In response to viewing profile 130c, friend 110b may believe that second dater 110c is likely compatible with first dater 110a (e.g., friend 110b may believe that the potential exists for first dater 110a and second dater 110c to enter into a successful dating relationship offline). Accordingly, friend 110b may select profile 130c, belonging to second dater 110c, in the hopes of generating a match in the system between first dater 110a and second dater 110c. If second dater 110c, friend 110d of second dater 110c, and/or friend 110e of second dater 110c similarly selects profile 130a, belonging to first dater 110a, as a potential match for second dater 110c, matching tool 105 will generate a match between first dater 110a and second dater 110c, enabling communication between the two daters. In this manner, matching tool 105 enables both dater 110a and friend 110b of dater 110a to participate in the matching process for dater 110a.

As another example, in certain embodiments, rather than being able to generate matches for first dater 110a, friend 110b of first dater 110a may be able to suggest profiles to first dater 110a that friend 110b thinks first dater 110a should attempt to match with. For example, in response to receiving a series of recommendations for first dater 110a that includes profile 130c, belonging to second dater 110c, friend 110b may select profile 130c, thereby generating an indication to first dater 110a that friend 110b thinks that first dater 110a should select profile 130c (e.g., friend 110b thinks that first dater 110a and second dater 110c are likely compatible). In certain embodiments, the indication to first dater 110a that friend 110b thinks that first dater 110a should select profile 130c may correspond to matching tool 105 reordering the series of recommendations presented to first dater 110a, such that profile 130c is located earlier in the series of recommendations than if friend 110b had not selected profile 130. For example, matching tool 105 may reorder the series of recommendations such that profile 130c is the first profile presented to dater 110a. In some embodiments, the indication to first dater 110a that friend 110b thinks that first dater 110a should select profile 130c may correspond to an indication placed on profile 130c, as presented to first dater 110a. For example, profile 130c, as presented to first dater 110a, may include an icon or a statement such as "friend 110b thinks that you and dater 110c would be a great match," or any similar phrase indicating that friend 110b has suggested profile 130c to first dater 110a. The manner by which matching tool 105 generates recommendations for users 110 and matches users 110 with one another is described in further detail below, in the discussion of FIGS. 3 and 4.

Devices 115 may be used by users 110 to receive incoming messages 185 and to send outgoing messages 190. While illustrated in FIG. 1 as incoming messages 185 passing directly from matching tool 105 to devices 115 and outgoing messages 190 passing directly from devices 115 to matching tool 105, this disclosure contemplates that the exchange of messages 185 and 190 between matching tool 105 and devices 115 is facilitated by network 120. For example, matching tool 105 may transmit incoming messages 185 to devices 115 over network 120. Similarly, devices 115 may transmit outgoing messages 190 to matching tool 105 over network 120.

This disclosure contemplates that incoming messages 185 may include any messages received by devices 115. Similarly, outgoing messages 190 may include any messages transmitted by devices 115. As an example, incoming message 185 may include a series of profiles 130, recommended for dater 110a and received by device 115a of dater 110a and/or device 115b of friend 110b of dater 110a. In this example, outgoing message 190 may then include one or more selections of profiles 130, transmitted by device 115a of dater 110a and/or device 115b of friend 110b of dater 110a, and selected from the series of profiles 130 recommended for dater 110a. This form of incoming message 185 and outgoing message 190 is described in further detail below, in the discussion of FIGS. 3 and 4.

As another example, incoming messages 185 may include requests for information from users 110, used by matching tool 105 to generate profiles 130. Outgoing messages 190 may then include the information submitted by users 110, in response to requests 185. For example, incoming messages 185 may include requests for users' names, genders, ages, birthdates, and/or any other personal information, and outgoing messages 190 may include responses, containing such personal information. The manner by which matching tool 105 generates requests 185 for personal information and creates user profiles 130 using responses 190 is described in further detail below, in the discussion of FIGS. 2A and 2B.

As another example, incoming messages 185 and outgoing messages 190 may include messages originating from a first user 110a or 110b and destined for a second user 110c, 110d, and/or 110e (or vice versa), where matching tool 105 is used to facilitate communication between first user 110a or 110b and second user 110c, 110d, and/or 110e. For example, first user 110a may transmit message 190 to matching tool 105, for ultimate receipt by second user 110c. Matching tool 105 may then transmit the contents of message 190 to second user 110c, as message 185. In a similar manner, messages 190 may include messages originating from first dater 110a and destined for friend 110b (or vice versa). For example, incoming messages 185 and outgoing messages 190 may include portions of a chat session between any combination of first dater 110a, first friend 110b of first dater 110a, second dater 110c, first friend 110d of second dater 110c, and second friend 110e of second dater 110c, as described in further detail below, in the discussion of FIG. 6.

As a further example, incoming messages 185 may include information relating to the activities of first dater 110a and/or first dater's friend 110b, with respect to matching tool 105. For example, incoming message 185 may include an activity feed, as described in further detail below, in the discussion of FIG. 5.

Devices 115 include any appropriate device for communicating with components of system 100 over network 120. For example, device 115 may be or may be accompanied by a telephone, a mobile phone, a computer, a laptop, a tablet, a server, an automated assistant, and/or a virtual reality or augmented reality headset or sensor, or other device. This disclosure contemplates device 115 being any appropriate device for sending and receiving communications over network 120. For example, devices 115 may include any appropriate devices for receiving incoming messages 185 and transmitting outgoing messages 190. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110. In some embodiments, an application executed by device 115 may perform the functions described herein. In certain embodiments, devices 115 may communicate with matching tool 105 through network 120 via a web interface.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 125 may store a set of user profiles 130. Database may contain any number of user profiles 130a, 130b, 130c, through 130n. User profiles 130 define or represent features of users 110. Profiles 130 may be available to the general public, to those who are members of the online dating system, and/or to a specific category of those members of the online dating system. Profiles 130 may contain information that was solicited from users 110 when users 110 set up their online dating accounts or was otherwise input by such users into their profiles, as described in further detail below, in the discussion of FIG. 2B. Profiles 130 may include general information such as age, height, gender, and occupation, as well as detailed information that may include the users' interests, likes/dislikes, personal feelings, and/or outlooks on the world. This disclosure contemplates that in certain embodiments, profiles 130a and 130c, assigned to daters 110a and 110c, respectively, may include more detailed information than profiles 130b, 130d, and 130e, assigned to friends 110b, 110d, and 110e of daters 110a and 110c. Profiles 130a and 130c may include more detailed information than profiles 130b, 130d, and 130e, because the information contained in profiles 130a and 130c may be used by matching tool 105 to facilitate matching between daters 110a and 110c. The information contained in profiles 130b, 130d, and 130e may also be used by daters 110a and 110c to locate and identify their friends in the online dating system.

As seen in FIG. 1, matching tool 105 includes processor 135, memory 140, and interface 142. This disclosure contemplates processor 135, memory 140, and interface 142 being configured to perform any of the functions of matching tool 105 described herein. Generally, matching tool 105 implements profile generator 160, recommendation engine 165, matching engine 170, feed generator 175, and chatting engine 180. Profile generator 160 is used to generate user profiles 130, stored in database 125, as described in further detail below, in the discussion of FIG. 2. Recommendation engine 165 is used to generate recommendations for a given dater 110a of other, potentially compatible daters 110c, as described in further detail below, in the discussion of FIG. 3. Matching engine 170 is used to receive feedback from users 110 of the recommendations for daters 110a and 110c, provided by recommendation engine 165 to users 110, and to match daters 110a and 110c based on this feedback, as described in further detail below, in the discussion of FIG. 4. Feed generator 175 is used to generate activity feeds, based on the activities of users 110 with respect to matching tool 105, as described in further detail below, in the discussion of FIG. 5.

Chatting engine 180 is used to facilitate communication between users 110 of matching tool 105. This disclosure contemplates that chatting engine 180 may be configured to facilitate any suitable type of communication amongst users 110. As an example, chatting engine 180 may be configured to facilitate communication between first dater 110a and second dater 110c in response to matching engine 170 generating match 425 between first dater 110a and second dater 110c. For example, chatting engine 180 may be configured to receive message 190 transmitted by dater 110a, for ultimate receipt by dater 110c. In response to receiving message 190, chatting engine 180 may be configured to transmit the contents of message 190 to dater 110c, as message 185. In certain embodiments in which second dater 110c has granted friend 110d permission to chat with second dater 110c's matches on his/her behalf, chatting engine 180 may be configured to facilitate communication between first dater 110a and friend 110d of second dater 110c, in response to matching engine 170 generating match 425 between first dater 110a and second dater 110c. In some embodiments, first dater 110a may be aware that he/she is chatting with friend 110d of second dater 110c, rather than second dater 110c. In certain embodiments, first dater 110a may not be aware that he/she is chatting with friend 110d of second dater 110c, rather than second dater 110c.

As another example, chatting engine 180 may be configured to facilitate communication between first dater 110a, second dater 110c, and first friend 110b who selected profile 130c, belonging to second dater 110c, on behalf of first dater 110a. For example, first friend 110b may use chatting engine 180 to make an introduction between first dater 110a and second dater 110c. Here, chatting engine 180 may be configured to receive message 190, transmitted by friend 110b, for ultimate receipt by both daters 110a and 110c. In response to receiving message 190, chatting engine 180 may be configured to transmit the contents of message 190 to both first dater 110a and second dater 110c as message 185. As a specific example, first friend 110b may use chatting engine 180 in this manner to present first dater 110a and second dater 110b with an icebreaker question. In certain embodiments, friend 110b of first dater 110a may only be permitted to communicate with second dater 110c if first dater 110a has set permissions 150b, belonging to friend 110b, to allow for such communication.

As another example, chatting engine 180 may be configured to facilitate communication between dater 110a and his/her friends 110 or a subset of his/her friends 110. For example, in certain embodiments, chatting engine 180 may be configured to generate a group chat amongst the members of a team or group of friends 110 created by dater 110a. This group chat may be accessible to the members of dater 110a's team/group through a graphical user interface which may be generated by chatting engine 180 and displayed on devices 115 belonging to the members of dater 110a's team/group. In certain embodiments, chatting engine 180 may also be configured to facilitate communication between a subset of the members of a team/group belonging to dater 110a. For example, team/group members 110b, 110f, and 110g may generate a chatting session amongst one another to discuss a profile 130 that one or more of the team/group members is considering sharing with dater 110a, prior to sharing profile 130 with dater 110a.

As another example, in certain embodiments, in response to dater 110a inviting friend 110b to connect with dater 110a within matching tool 105 (e.g., inviting friend 110b to join dater 110a's friend list), dater 110a may add friend 110b to a group chat. This disclosure contemplates that dater 110a may create any number of group chats and assign his/her friends to such group chats in any manner. For example, dater 110a may create a first group chat for his/her college friends, a second group chat for his/her work friends, and a third group chat for his/her closest friends, where the membership of the third group chat may overlap with the membership of the first and/or second group chats. In certain embodiments, members of a group chat may share profiles 130 with one another using the group chat. This aspect of chatting engine 180 is described in further detail below, in the discussion of FIG. 6.

In certain embodiments, chatting engine 180 may additionally be configured to facilitate communication between groups of users 110 with common interests. Such groups may be self-generated by users 110, or moderated groups generated by system administrators. As an example, a user 110 may generate group for dachshund lovers, which any other users may join. The formation of such groups may be desirable as they may provide an additional avenue for daters 110a and friends 110b of daters 110a to discover potential matches for daters 110a.

Chatting engine 180 may be a software module stored in memory 140 and executed by processor 135. An example algorithm for chatting engine 180 is as follows: (1) receive message 190 transmitted by user 110a and destined for user 110d; (2) determine that user 110a is permitted to communicate with user 110d (e.g., user 110a is a member of a team or group created by user 110d (or vice versa), user 110a and user 110d have been matched by matching tool 105, user 110d is a member of a team or group belonging to user 110c with whom user 110a has matched (or vice versa), and/or user 110a and user 110d are members of a group chat based on a common interest); (3) transmit the contents of message 190 in message 185 to user 110d. While the above example presents one possible algorithm for chatting engine 180, this disclosure contemplates that chatting engine 180 may use any algorithm operable to facilitate communication between users 110. For example, the algorithm used by chatting engine 180 may include modifications, additions, or omissions to the example algorithm presented above. Furthermore, the algorithm used by chatting engine 180 may include more, fewer, or other steps as compared with the example algorithm presented above, and the steps may be performed in parallel or in any suitable order.

Processor 135 may be any electronic circuitry, including, but not limited to microprocessors, application specific integrated circuits (ASIC), application specific instruction set processor (ASIP), and/or state machines, that communicatively couples to memory 140 and interface 142 and controls the operation of matching tool 105. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory 140 to perform any of the functions described herein. Processor 135 controls the operation and administration of matching tool 105 by processing information received from network 120, device(s) 115, interface 142, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

In certain embodiments, memory 140 may also store recommendation algorithm 145, a set of friend permissions 150, and/or a set of algorithm weights 155. Recommendation algorithm 145 is an algorithm configured to generate, for a given dater 110a, recommendations of profiles 130 belonging to other daters 110c, who may potentially be compatible with dater 110a. This disclosure contemplates that recommendation algorithm 145 may determine potential compatibility in any suitable manner. As an example, recommendation algorithm 145 may determine that first dater 110a and second dater 110c are potentially compatible based on similarities between profile 130a, belonging to first dater 110a, and profile 130c, belonging to second dater 110c. As another example, recommendation algorithm 145 may determine that first dater 110a and second dater 110c are potentially compatible based on previous profile preferences expressed by first dater 110a and/or second dater 110c. As a further example, recommendation algorithm 145 may determine that first dater 110a and second dater 110c are potentially compatible by computing attractiveness scores for each of first dater 110a and second dater 110c and determining that first dater 110a and second dater 110c have similar attractiveness scores, under the assumption that people are more likely to match with people of similar attractiveness. Additional details and examples of recommendation algorithm 145 are presented in further detail below, in the discussion of FIG. 3.

The set of algorithm weights 155 may include one or more weights assigned to each of users 110a through 110e. For example, first weight 155a may be assigned to first dater 110a, second weight 155b may be assigned to first friend 110b of first dater 110a, third weight 155c may be assigned to second dater 110c, fourth weight 155d may be assigned to first friend 110d of second dater 110c, and fifth weight 155e may be assigned to second friend 110e of second dater 110c. Each weight 155a through 155d may indicate the relative importance that matching algorithm 145 should place on previous profile preferences expressed by users 110. As an example, a value for first weight 155a of 1.0 and a value for second weight 155b of 0.5 may indicate that matching algorithm 145 should place twice as much importance on a previous profile preference received from first dater 110a, and indicating that first dater 110a would like to match with a dater 110 associated with profile 130f, as compared to a previous profile preference received from friend 110b of first dater 110a, and indicating that friend 110b would like first dater 110a to match with a dater 110 associated with profile 130i, when determining future profile recommendations for first dater 110a. As another example, a value for fourth weight 155d of 0.8 and a value for fifth weight 155e of 0.4 may indicate that matching algorithm 145 should place greater importance on previous profile preferences received from first friend 110d of second dater 110c than on previous profile preferences received from second friend 110e of second dater 110c, when determining future profile recommendations for second dater 110c. The use of weights 155 is described in further detail below, in the discussion of FIG. 3.

Friend permissions 150 may include permissions granted by daters 110 to their friends, which indicate the permissible actions that the friends may take when acting on behalf of daters 110. For example, first dater 110a may grant friend 110b permissions 150b, indicating that friend 110b may attempt to match with other users on behalf of dater 110a and to communicate with other daters 110c on behalf of first dater 110a. This disclosure contemplates that friend permissions 150 may include any suitable permissions that a dater 110a may grant to his/her friends. For example, permissions 150 may include permissions to select profiles 130 in an attempt to match dater 110a with other daters; suggest profiles 130 to dater 110a; edit profile 130a, assigned to dater 110a; suggest edits to profile 130a, assigned to dater 110a; communicate with matches generated for dater 110a on behalf of dater 110a; communicate with matches generated for dater 110a as a friend of dater 110a; view the behavior of dater 110a while interacting with matching tool 105; and/or any other appropriate permissions that dater 110a may grant to his/her friends. The use of friend permissions 150 is described in further detail below, in the discussion of FIGS. 2 through 5.

Interface 142 represents any suitable device operable to receive information from network 120, transmit information through network 120, perform suitable processing of the information, communicate to other devices, or any combination of the preceding. For example, interface 142 transmits messages 185 to devices 115 and receives messages 190 from devices 115. As another example, interface 142 may facilitate the exchange of messages between users 110, for example, by receiving a message transmitted by user 110a for ultimate receipt by user 110c and then transmitting the message to user 110c. Interface 142 represents any port or connection, real or virtual, including any suitable hardware and/or software, including protocol conversion and data processing capabilities, to communicate through a LAN, WAN, or other communication systems that allows matching tool 105 to exchange information with devices 115 and/or other components of system 100 via network 120.

Modifications, additions, or omissions may be made to the systems described herein without departing from the scope of the invention. For example, system 100 may include any number of users 110, devices 115, networks 120, and databases 125. The components may be integrated or separated. Moreover, the operations described above may be performed by more, fewer, or other components. Additionally, the operations may be performed using any suitable logic comprising software, hardware, and/or other logic. As used in this document, "each" refers to each member of a set or each member of a subset of a set.

Figure 2A:
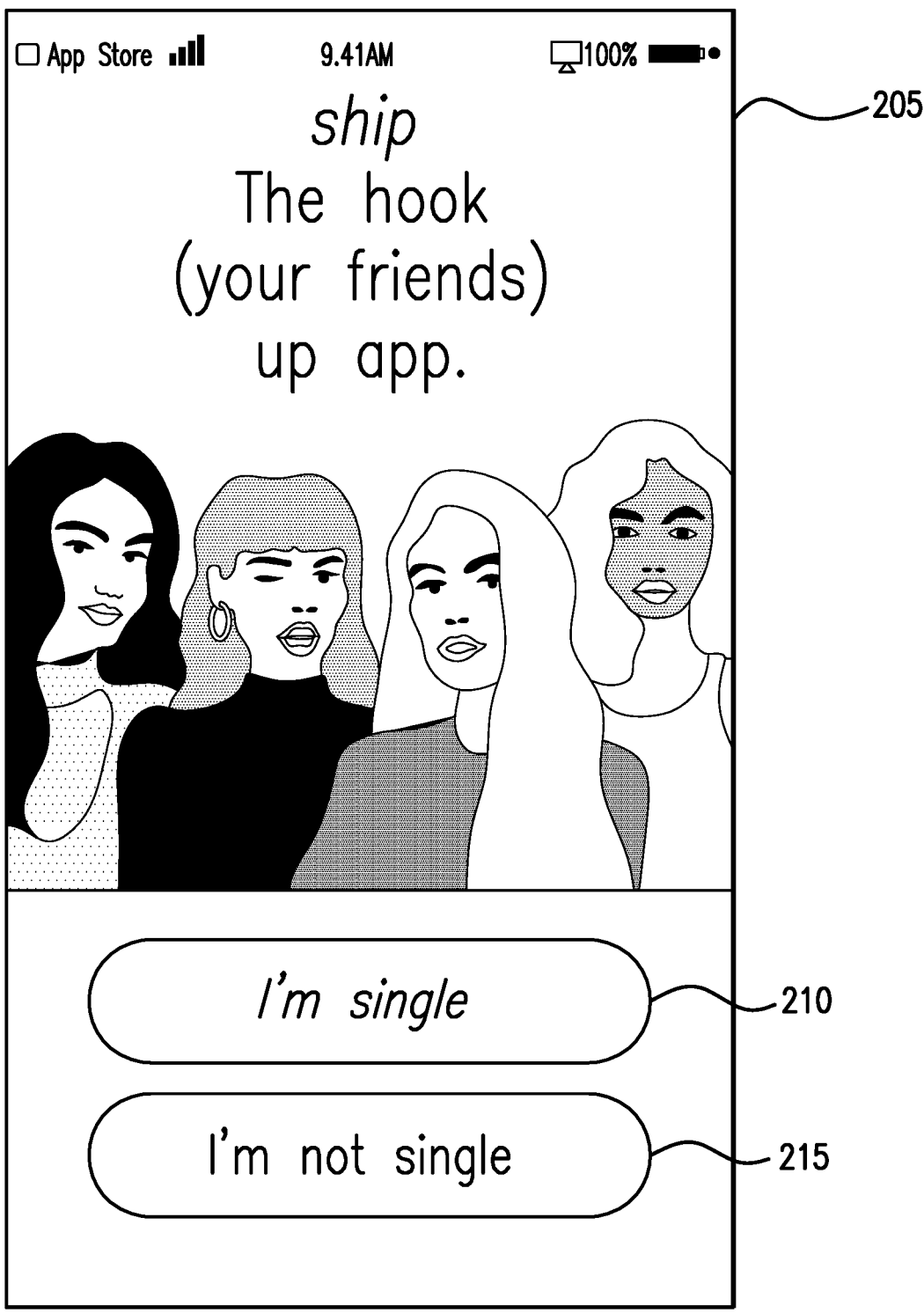
FIG. 2A illustrates a registration page of a graphical user interface generated by the profile generator of the matching tool of the system of FIG. 1.
Figure 2B:
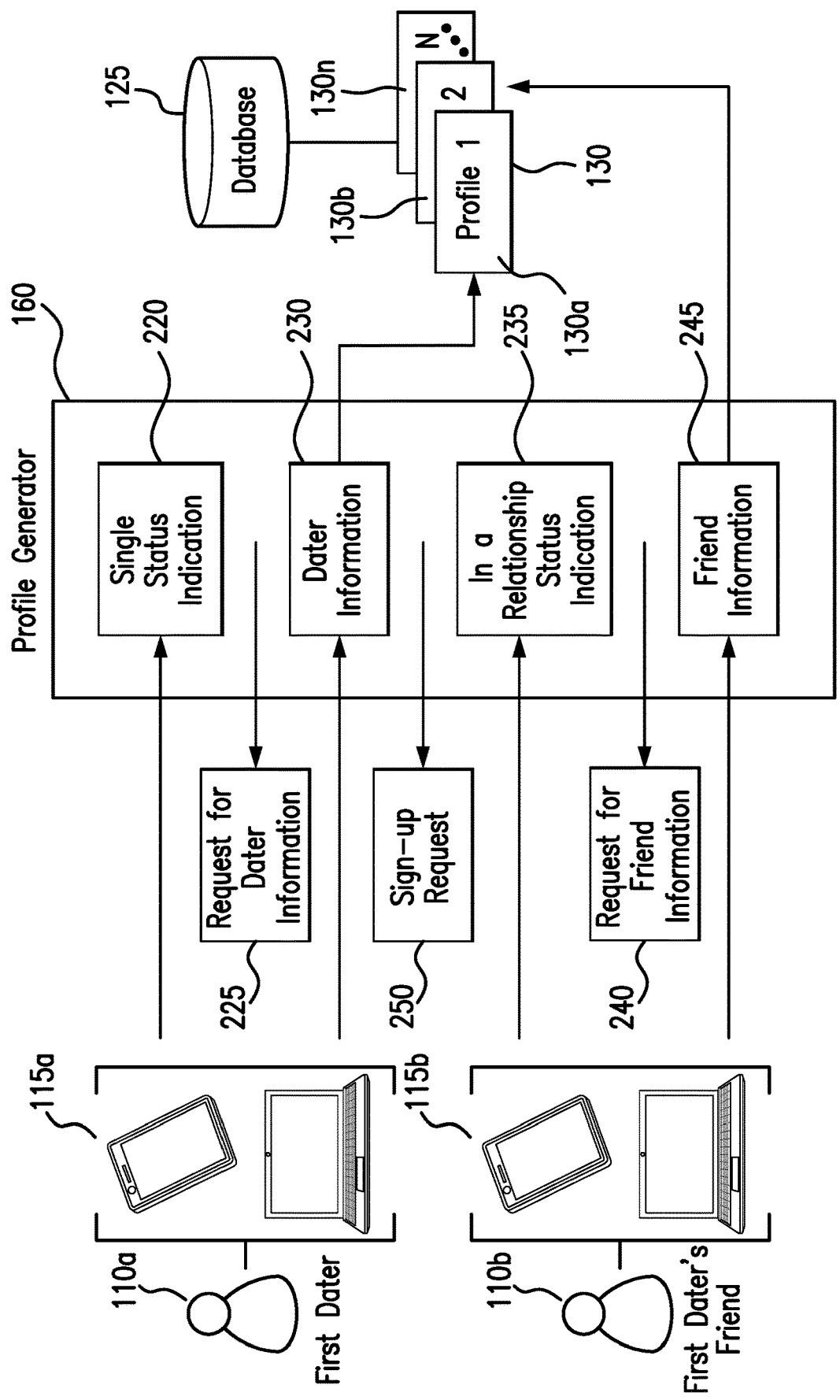
FIG. 2B illustrates an example of the behavior of the profile generator of the matching tool of the system of FIG. 1.

FIGS. 2A and 2B illustrate the process by which matching tool 105 registers users 110 and generates profiles 130 for users 110. In certain embodiments, users 110 (including both daters and friends of daters) register with matching tool 105 prior receiving recommendations from the tool. The registration process may involve submitting information to matching tool 105, which is then used by the tool to generate profiles 130 for the users.

FIG. 2A illustrates an example graphical user interface 205, displayed on a device 115 of user 110, and used by user 110 to begin the process of registering with matching tool 105. Matching tool 105 may present user 110 with graphical user interface 205 in response to several different scenarios. As an example, a user 110, interested in participating in the online dating experience, may access the Internet via device 115 and travel to a website managed by matching tool 105. The website may then present graphical user interface 205 to user 110. As another example, a user 110 may download an application to device 115, through which user 110 may interact with matching tool 105. In response to accessing the application for the first time, the application may present graphical user interface 205 to user 110.

As another example, matching tool 105 may transmit a message 185 to an existing user (e.g., 110a), requesting that user 110a invite his/her friends to participate in the online dating experience. For example, matching tool 105 may first transmit a message 185 to user 110a requesting that user 110a provide matching tool 105 with access to the contacts stored on device 115 of user 110a. If user 110a transmits a response 190 to matching tool 105 granting matching tool 105 permission to access the contacts stored on device 115, matching tool 105 may then transmit a list of contacts to device 115, from which user 110a may choose to invite one or more of the listed contacts to participate in the online dating experience. For example, in response to receiving the list of contacts, user 110a may indicate to matching tool 105 that he/she wishes to invite a first contact (e.g., 110b) to register with matching tool 105. In certain embodiments, in response to receiving an indication from user 110a indicating that he/she wishes to invite first contact 110b to register with matching tool 105, matching tool 105 may automatically generate and transmit to first contact 110b sign-up request 250, in the form of an SMS and/or email message that includes a link through which first contact 110b may access graphical user interface 205, to begin the registration process. In some embodiments, rather than automatically transmitting an SMS and/or email message, matching tool 105 may access an SMS and/or email application on device 115 of user 110a and pre-populate an SMS and/or email message to first contact 110b, with a link through which first contact 110b may access graphical user interface 205. User 110a may then choose to transmit the pre-populated SMS and/or email message to first contact 110b.

In certain embodiments, in addition to or instead of requesting access to the contacts stored on device 115 of user 110a, matching tool 105 may request access to one or more applications installed on device 115, through which user 110a may communicate with other individuals. For example, matching tool 105 may request access to one or more applications such as WECHAT, WHATSAPP, LINE, FACEBOOK, INSTAGRAM, LINKEDIN, or any other application through which user 110a may communicate with other individuals. If user 110a grants matching tool 105 access to any of these communication applications, matching tool 105 may access user 110a's friend lists, stored in the application(s), and generate invites, as described above, for one or more individuals stored in the friend lists. These invites may then be communicated through the application (s) to the individuals.

As illustrated in FIG. 2A, in certain embodiments, prior to receiving recommendations from matching tool 105, matching tool 105 may request that users 110 self-identify as either single or in a relationship. For example, graphical user interface 205 may include a pair of interactive buttons 210 and 215, through which user 110 may specify whether he/she is single or is in a relationship. User 110 may select button 210 to indicate that he/she is single, or user 110 may select button 215 to indicate that he/she is in a relationship.

If user 110a registers as "single," matching tool 105 treats user 110a as an active dater and may provide user 110a with access to the full set of features offered by the online dating experience created by matching tool 105. For example, dater 110a may receive profile recommendations, select profiles to match with, and chat with matches, among other activities. Dater 110a may also perform any of these functions on behalf of his/her single friends, provided these single friends have granted dater 110a permission to do so. Additionally, profile 130a, belonging to dater 110a, may be viewable and selectable by other users 110.

If user 110b registers as "in a relationship," matching tool 105 may limit the activities that user 110b may perform while interacting with the tool to only those activities that may be performed by a friend of a dater. For example, in certain embodiments, friend 110b may not receive any profile recommendations for him/herself, or match him/herself with any other users 110 (e.g., profile 130b, belonging to friend 110b, may not be selectable by other users 110 seeking to generate matches for daters 110a and 110c). Instead, friend 110b may act on behalf of daters 110a who have granted permissions 150b to friend 110b to do so. For example, dater 110a may grant friend 110b permissions 150b that include the permission to: (1) select profiles 130 in an attempt to match other users 110 with dater 110a; (2) suggest profiles 130 to dater 110a; (3) edit profile 130a, assigned to dater 110a; (4) suggest edits of profile 130a to dater 110a; (5) communicate with matches generated for dater 110a on behalf of dater 110a; (6) communicate with matches generated for dater 110a as friend 110b of dater 110a; (7) view the behavior of dater 110a while interacting with matching tool 105a; and/or (8) any other appropriate permissions that dater 110a may grant to friend 110b.

This disclosure contemplates that a single user 110c may grant friend 110d permission to act on his/her behalf in any suitable manner. As an example, in certain embodiments, in response to inviting friend 110d to participate in the online dating experience generated by matching tool 105 (e.g., inviting friend 110d to connect through matching tool 105 and to be listed as one of user 110c's friends), single user 110c may grant friend 110d permissions 150d to act on his/her behalf. This disclosure contemplates that permissions 150 may be friend-specific. For example, dater 110c may grant first friend 110d permissions 150d, which may include the permission to select profiles 130 in an attempt to match other users 110 with dater 110c, while dater 110c may grant second friend 110e permissions 150e, which may include the permission to suggest profiles 130 to dater 110c, but not to select profiles 130 in an attempt to match other users 110 with dater 110c.

As another example, in certain embodiments, single user 110c may grant friend 110d permission to act on his/her behalf by inviting friend 110d to join a team and/or friend group belonging to user 110c. For example, in certain embodiments, in addition to or instead of inviting friend 110d to connect with user 110c through matching tool 105 and to be listed as a friend in a friend list belonging to user 110c, user 110c may invite friend 110d to join a team and/or group belonging to user 110c. In certain embodiments, in response to user 110c inviting friend 110d to connect with user 110c through matching tool 105, matching tool 105 may automatically assign friend 110d to a team/group belonging to user 110c. In certain embodiments, joining user 110c's team and/or group may automatically grant friend 110d permissions 150d to act on user 110c's behalf. For example, in certain embodiments, membership in user 110c's team/group may permit friend 110d to receive recommendations of profiles 130 belonging to those daters 110 who are potentially compatible with user 110c, and to select from amongst the recommended profiles. In some embodiments, membership in user 110c's team/group may permit friend 110d to act according to additional permissions 150d granted to friend 110d by user 110c. For example, as described above, dater 110c may grant friend 110d permissions 150d that may include the permission to: (1) select profiles 130 in an attempt to match other users 110 with dater 110c; (2) suggest profiles 130 to dater 110c; (3) edit profile 130c, assigned to dater 110c; (3) communicate with matches generated for dater 110c; (4) view the behavior of dater 110c while interacting with matching tool 105a; and/or (5) any other appropriate permissions that dater 110c may grant to friend 110d. In certain embodiments, permissions 150 may be group specific, such that all of the members of a user's team and/or group may be granted the same permissions 150. For example, single user 110c may grant first friend 110d permissions 150d, which are the same as permissions 150e granted to second friend 110e, in response to inviting both first friend 110d and second friend 110e to join his/her team and/or group. In some embodiments, single user 110c may create multiple teams and/or groups and assign each team and/or group a different set of permissions 150. For example, single user 110c may assign first friend 110d to a first group and second friend 110e to a second group. Single user 110c may then assign permissions 150d to the first group and permissions 150e to the second group, where permissions 150d and permissions 150e may be different from one another.

This disclosure contemplates that daters 110a and 110c may add friends 110b, 110d, and/or 110e to their friend lists, teams, and/or groups in any suitable manner. For example, in certain embodiments, in response to user 110b receiving and accepting an invite from dater 110a to register with matching tool 105, the tool may automatically add user 110b to dater 110a's friend list and/or team/group. Similarly, in response to dater 110a receiving and accepting an invite from friend 110b to register with matching tool 105, the tool may automatically add friend 110b to dater 110a's friend list and/or team/group.

As another example, in certain embodiments, dater 110a may add existing users 110b to his/her friend list, team(s), and/or group(s), where the existing users 110b have been identified by matching tool 105 as having already registered with matching tool 105. For example, in response to dater 110a granting matching tool 105 permission to access the contacts stored on device 115a of dater 110a, matching tool 105 may identify those contacts stored on device 115a who have already registered with matching tool 105. Similarly, in response to dater 110a granting matching tool 105 permission to access the friend lists stored in applications installed on device 115a, matching tool 105 may identify those friends listed in the friend lists who have already registered with matching tool 105. Matching tool 105 may identify these contacts/friends in any suitable manner. For example, matching tool 105 may identify a contact stored on device 115a as having already registered with matching tool 105 by determining that the telephone number listed for the contact is the same as a telephone number provided by a registered user 110. Matching tool 105 may also identify potential friends 110 for dater 110a based on the current membership of dater 110a's friend list, teams(s), and/or groups. As a specific example, matching tool 105 may determine that multiple members of dater 110a's friend list and/or team/group are also members of dater 110c's friend list and/or team/group. Based on this information, matching tool 105 may determine that a high probability exists that dater 110c is a friend or acquaintance of dater 110a. Accordingly, matching tool 105 may suggest to dater 110a that he/she add dater 110c to his/her friend list and/or team/group. As another example, in certain embodiments, dater 110a may add existing users 110b to his/her friend list and/or team/group by searching through a list of users 110 registered with matching tool 105 and inviting those users 110 that he/she recognizes and/or wishes to add to his/her friend list and/or team/group. As a further example, in certain embodiments, dater 110a may add existing users 110b to his/her team/group by viewing the membership lists of the other teams/groups to which dater 110a may belong (e.g., the teams/groups in which dater 110a is acting as a friend for another dater) and/or by viewing the friend lists of those users who belong to dater 110a's friend list (e.g., viewing the friends of dater 110a's friends).

This disclosure contemplates that a given dater 110a may form any number of teams and/or groups for him/herself. For example, dater 110a may place his/her high school friends in a first team/group and his/her college friends in a second team/group. Similarly, a given friend 110b may be placed in any number of teams/group and/or be granted permission to act on behalf of any number of daters 110. For example, both dater 110a and dater 110c may place friend 110b in each their teams/groups and/or grant friend 110b permission to act on each of their behalf. Friend 110b may then choose between acting on behalf of dater 110a or acting on behalf of dater 110c, when interacting with matching tool 105. This disclosure contemplates that in addition to being a friend of both dater 110a and dater 110c, user 110b may also be a dater him/herself. Accordingly, user 110b may choose between acting on behalf of dater 110a, dater 110c, or him/herself, when interacting with matching tool 105. During a single online dating session, user 110b may switch between acting on behalf of dater 110a, dater 110c, and him/herself. Switching between acting of behalf of dater 110a, dater 110c, or user 110b, him/herself, may consist simply of selecting one of dater 110a, dater 110c, and user 110b, him/herself, from a drop-down menu displayed by matching tool 105 on device 115b.

After a user 110 registers with matching tool 105 as either "single" or "in a relationship," matching tool 105 may transmit request 185 to user 110 seeking personal information from user 110. FIG. 2B illustrates the process by which profile generator 160 of matching tool 105 may request personal information from users 110, receive personal information from users 110, and generate profiles 130 using this personal information.

In response to receiving an indication 220 from dater 110a, indicating that dater 110a would like to register as "single" with matching tool 105, profile generator 160 may send request 225 to dater 110a, seeking personal information from dater 110a. This disclosure contemplates that request 225 may seek any personal information from dater 110a suitable to generate a profile 130a for dater 110a and/or to identify dater 110a in the online dating system generated by matching tool 105. For example, the personal information sought by request 225 may include dater 110a's: (1) name; (2) birthdate; (3) gender; (4) height; (5) political views; (6) physical activity level; (7) religion; (8) occupations; and/or (9) astrological sign. The personal information sought by request 225 may also include whether or not dater 110a has any children or pets, whether or not dater 110a smokes or drinks alcohol, and/or any other personal information suitable to identify dater 110a and/or facilitate matching between dater 110a and other daters 110. In certain embodiments, request 225 may also seek one or more photos of dater 110a. In some embodiments, request 225 may additionally ask dater 110a to describe him/herself, by providing one or more free-form descriptions of him/herself. For example, request 225 may ask dater 110a to describe him/herself by using (1) text only; (2) emojis only; (3) GIFs only; and/or (4) any combination of text, emojis, and/or GIFs. In response to receiving request 225, dater 110a may transmit personal information 230 to matching tool 105 for use by profile generator 160.

In certain embodiments, profile generator 160 may use request 225 to discover what dater 110a may be looking for in a potential match. For example, request 225 may ask dater 110a to specify his/her preference in gender and age range of a potential match. As another example, request 225 may also ask dater 110a to specify a distance within which dater 110a would prefer a potential match to be located. As a further example, request 225 may ask dater 110a to indicate how important certain factors are when looking for a match. In response to receiving such request 225, dater 110a may provide information 230 indicating the relative importance that he/she places on such factors. For example, information 230 may indicate that dater 110a places a high importance on the religion of any potential matches and a low importance on the political views of any potential matches.

As illustrated in FIG. 2B, in response to receiving information 230 from dater 110a, profile generator may use information 230 to generate profile 130a, assigned to dater 110a. For example, profile generator 160 may store the responses provided by dater 110a to each request 225 for information in profile 130a. Profile generator 160 may also store dater 110a's friend list and/or one or more lists of the members of dater 110a's team(s)/group(s), as well as any teams/groups to which dater 110a belongs in profile 130a. For example, in certain embodiments, profile 130a may indicate that friend 110b belongs to dater 110a's team/group and that dater 110a is a member of dater 110c's team/group. As another example, in certain embodiments, profile 130a may indicate that friend 110b is a friend of dater 110a.

In certain embodiments, profile generator 160 may generate the same type of profile 130 for users 110b who register with matching tool 105 as "in a relationship" as users 110a who register as "single." For example, in certain embodiments, in response to receiving an indication 235 from friend 110b, indicating that friend 110b would like to register as "in a relationship" with matching tool 105, profile generator 160 may send request 240 to friend 110b, seeking the same types of personal information from friend 110b as request 225 sought from dater 110a. On the other hand, in some embodiments, profile generator 160 may generate less detailed profiles 130 for users 110b who register with matching tool 105 as "in a relationship," as compared with users 110a who register with matching tool 105 as "single." For example, in response to receiving indication 235 from friend 110b that friend 110b would like to register as "in a relationship," profile generator 160 may send request 240 to friend 110b, seeking basic personal information from friend 110b. For example, request 240 may ask friend 110b for his/her: (1) name; (2) birthdate; (3) geographical location; (4) telephone number; and/or (5) any other personal information suitable to identify friend 110b to other users 110. Profile generator 160 may seek more detailed personal information from dater 110a as compared with friend 110b, because matching tool 105 may be configured to generate recommendations of other, potentially compatible daters 110 for dater 110a, based at least in part on the information included in profile 130a of dater 110a. On the other hand, the information included in profile 130b of friend 110b may simply be used to help dater 110a identify friend 110b as an individual that dater 110a knows outside of the online dating experience generated by matching tool 105 and that dater 110a would like to invite to join his/her friend list and/or team/group.

In certain embodiments, profile generator 160 may add information to profile 130b, belonging to friend 110b, in response to the activities performed by friend 110b on behalf of dater 110a. For example, profile generator 160 may add information to profile 130b to indicate (1) the number of times that friend 110b has selected a profile on behalf of dater 110a; (2) the number of matches that have been generated for dater 110a as a result of friend 110b's selections; (3) the rate at which friend 110b selects profiles for dater 110a (e.g., the number of selections per day); (4) how selective friend 110b is in choosing profiles (e.g., friend 110b may be assigned a high selectivity factor if friend 110b selects only a small portion of the profiles 130 presented to him/her, or a low selectivity factor if friend 110b selects a large portion of the profiles presented to him/her); (5) the number of positive interactions experienced by dater 110a based on selections made by friends 110b, which may be determined automatically based on data captured by matching tool 105 or manually entered by dater 110a; and/or (6) any other information relating to friend 110b's activities while interacting with matching tool 105. For example, profile generator 160 may also add badges to profile 130b, to indicate achievements obtained by friend 110b. For example, profile generator 160 may add a "super-setter-upper" badge to profile 130b to indicate that the number of matches that friend 110b has generated for dater 110a has exceeded a given threshold.

Profile generator 160 may be a software module stored in memory 140 and executed by processor 135. An example algorithm for profile generator 160 is as follows: (1) receive indication 220 that dater 110a seeks to register as "single" with matching tool 105; (2) transmit request 225 to dater 110a, asking for detailed personal information from dater 110a; (3) receive detailed personal information 230 from dater 110a; (4) in response to receiving detailed personal information 230 from dater 110a, generate profile 130a, based on detailed personal information 230; (5) store profile 130a in database 125; (6) receive indication 235 that friend 110b seeks to register as "in a relationship" with matching tool 105; (7) transmit request 240 to friend 110b, asking for basic personal information from friend 110b; (8) receive basic personal information 245 from friend 110*b*; (9) in response to receiving basic personal information 245 from friend 110*b*, generate profile 130*b*, based on basic personal information 245; and (10) store profile 130*b* in database 125. While the above example presents one possible algorithm for profile generator 160, this disclosure contemplates that profile generator 160 may use any algorithm operable to receive information from users 110 and generate profiles 130 based on such information. For example, the algorithm used by profile generator 160 may include modifications, additions, or omissions to the example algorithm presented above. Furthermore, the algorithm used by profile generator 160 may include more, fewer, or other steps as compared with the example algorithm presented above, and the steps may be performed in parallel or in any suitable order.

While illustrated in FIG. 2B as dater 110*a* interacting with profile generator 160 to generate profile 130*a* for him/herself and friend 110*b* similarly interacting with profile generator 160 to generate profile 130*b* for him/herself, in certain embodiments, friend 110*b* may be able to interact with profile generator 160 to generate profile 130*a* for dater 110*a*. For example, in certain embodiments, dater 110*a* may grant friend 110*b* permission to edit and/or complete his/her profile 130*a*. In some embodiments, dater 110*a* may grant friend 110*b* permission to suggest edits to dater 110*a*'s profile 130*a*. Dater 110*a* may then choose whether or not to accept the suggested edits. As another example, after registering as "in a relationship" with matching tool 105, friend 110*b* may be permitted to generate a profile 130 for one or more of his/her single friends who have not yet registered with matching tool 105. In this manner, friend 110*b* may be able to receive recommendations and select potential matches for his/her single friend before the single friend has ever interacted with matching tool 105. This may be desirable as it may enable friend 110*b* to participate in the online dating experience even if none of his/her single friends have completed the registration process at the time friend 110*b* registers with the system. This may also be desirable as the single friend for whom friend 110*b* has generated a profile may be more inclined to register with matching tool 105 if he/she knows that he/she has already been matched with one or more daters 110*a* and/or 110*c* in the system, before he/she has even signed up.

In certain embodiments, for privacy reasons, friend 110*b* may only be permitted by matching tool 105 to generate a profile 130 for one of his/her single friends who have not yet registered with matching tool 105 if friend 110*b* and/or matching tool 105 first obtains the permission of the single friend(s). For example, in certain embodiments, in response to friend 110*b* generating profile 130*a* for his/her single friend, matching tool 105 may send a message (e.g., an email or SMS message) to the single friend requesting that the single friend approve the profile. If the single friend declines to approve profile 130*a*, the profile may not be viewable, searchable, or selectable by any users 110 of matching tool 105.

In certain embodiments, friend 110*b* may not be required to register with matching tool 105 or to provide any profile information to matching tool 105 prior to interacting with matching tool 105. For example, in certain embodiments, dater 110*a* may permit friend 110*b* to select profiles 130 on behalf of dater 110*a* by providing friend 110*b* access to the online dating system generated by matching tool 105 through a rich media component embedded in an email and/or SMS message. This rich media component may provide friend 110*b* with a singular instance of access to matching tool 105, where friend 110*b* is granted access to the tool as dater 110*a* (e.g., matching tool 105 may attribute any actions performed by friend 110*b* to dater 110*a*). Enabling friend 110*b* to participate in the online-matching experience of dater 110*a* without registering with matching tool 105 or providing any profile information to matching tool 105 may be desirable for those individuals who are in a relationship and do not want to download and/or register with an online dating tool out of fear of the appearance of impropriety.

In certain embodiments, matching tool 105 may enable users 110 to share profile information onto one or more social media networks. As an example, matching tool 105 may enable dater 110*a* to share his/her profile picture onto a social media network. Dater 110*a* may wish to share his/her profile picture onto a social media network in order to obtain feedback from his/her connections on the social media network, and/or to encourage his/her connections on the social media network to join matching tool 105 and to become members of dater 110*a*'s friend list and/or team/group. As another example, matching tool 105 may enable friend 110*b* of dater 110*a* to share profile information belonging to dater 110*a* onto one or more social media networks. For example, friend 110*b* may share a profile picture belonging to dater 110*a* onto a social media network, to advertise that dater 110*a* is seeking a relationship and to encourage members of the social media network to join matching tool 105 to attempt to match with dater 110*a*. In certain embodiments, friend 110*b* may only be permitted to share profile information belonging to dater 110*a* onto social media networks if dater 110*a* has granted friend 110*b* the permission to do so (e.g., dater 110*a* has set permissions 150*b* for friend 110*b* to enable friend 110*b* to share dater 110*a*'s profile information).

In certain embodiments, matching tool 105 may enable users 110 to publish and/or share a link to their profiles 130 and/or profiles 130 of their friends. For example, matching tool 105 may enable dater 110*a* to publish and/or share a link to his/her profile 130*a* on one or more social networks, on a website, in an email, in an SMS message, or in any other suitable manner. As another example, matching tool 105 may enable friend 110*b* of dater 110*a* to publish and/or share a link to dater 110*a*'s profile on one or more social networks, on a website, in an email, in an SMS message, or in any other suitable manner.

In certain embodiments, matching tool 105 may charge a subscription fee to users 110. This subscription fee may be limited to those users who register as "single" with matching tool 105, and become daters in the system, or the fee may be charged to both users who register as "single" as well as users who register as "in a relationship" with matching tool 105.

In certain embodiments, matching tool 105 may enable one or more of the members of a dater's friend list and/or team/group to pay for his/her subscription fee. As an example, in certain embodiments, an interactive option may exist on a dater's profile 130, inviting the dater's friends to pay all or part of the dater's subscription costs. For example, the option may permit a friend to pay for the dater's subscription costs for a set period of time (e.g., two months), or may permit a friend to pay for a portion of the dater's recurring subscription charge (e.g., $5 dollars out of the total subscription charge). In certain embodiments, the option for a friend to pay for all or part of the dater's subscription costs may exist on all dater profiles 130. In other embodiments, a dater 110 may choose to add the option to his/her profile 130. In some embodiments, matching tool 105 may additionally enable a dater 110 to solicit subscription contributions from his/her friends by adding a personalized message to his/her profile 130, requesting contributions, and/or by sending messages to his/her team/group members requesting contributions. In certain embodiments, if a dater 110 lapses in one or more of his subscription payments, matching tool 105 may solicit the lapsed payments from dater 110's friends. For example, matching tool 105 may send a message to dater 110's friends asking the friends to "chip in and help dater 110 continue his search for love," or any other suitable request for monetary contributions from dater 110's friends.

In certain embodiments, in addition to the payment of a subscription free, matching tool 105 may enable dater 110 and/or dater 110's friends to pay for any number of a-la-carte features. For example, user 110 may purchase a "powerup" to boost the visibility of his/her profile 130 or of a profile 130 belonging to one of his/her friends. As another example, by default, user 110a's connections (e.g., list of friends and/or team/group members) may not be visible to another user 110d, who is not connected with user 110a, without payment of a fee. User 110d may wish to pay such a fee to view user 110a's connections in order to help the user evaluate user 110a when determining whether or not to attempt to match with user 110a or to select user 110a on behalf of one of user 110d's friends.

While FIG. 2B illustrates profile generator 160 generating profiles 130 for dater 110a and friend 110b, this disclosure contemplates that profile generator 160 may generate profiles 130 for any number of users 110. Furthermore, this disclosure contemplates that modifications, additions, or omissions may be made to profile generator 160 without departing from the scope of the invention. For example, this disclosure contemplates that some or all of the operations described above as being performed by profile generator 160, may be performed by other components of matching tool 105. Such components may be integrated or separated. Furthermore, the operations may be performed using any suitable logic comprising software, hardware, and/or other logic.

Figure 3A:
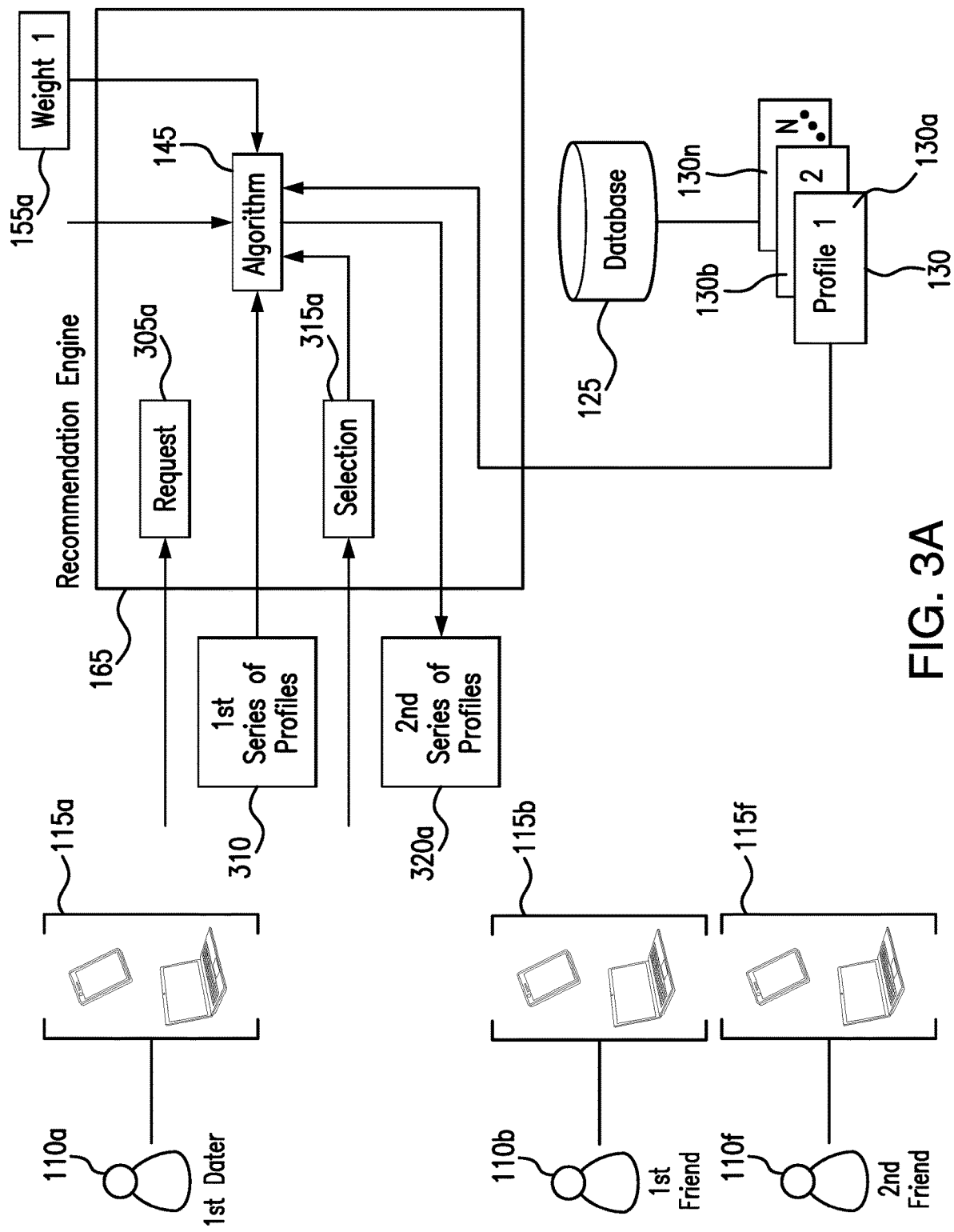
FIGS. 3A through 3C illustrate examples of the behavior of the recommendation engine of the matching tool of the system of FIG. 1, in response to receiving profile selections from a dater or one of the dater's friends.
Figure 3B:
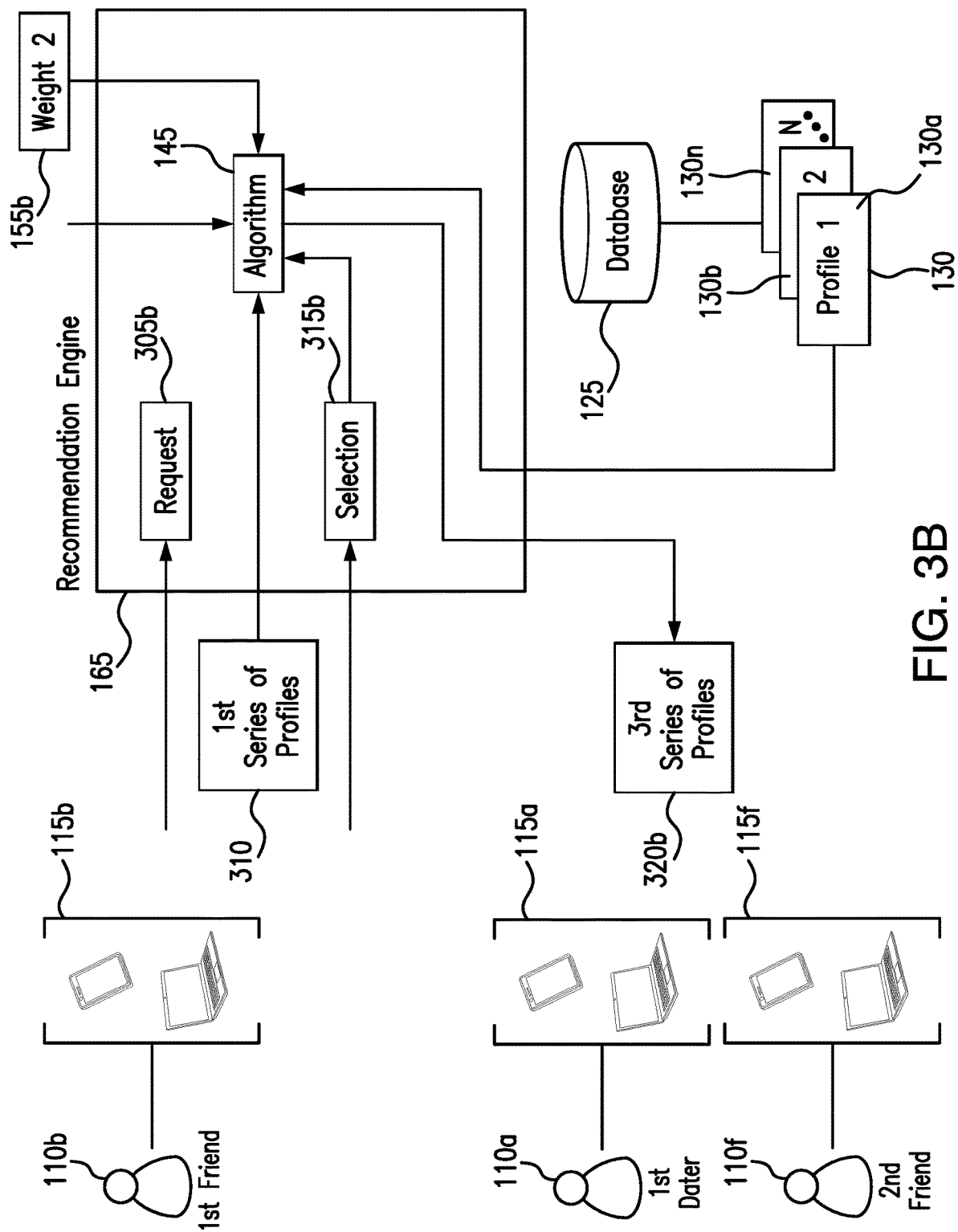
Figure 3C:
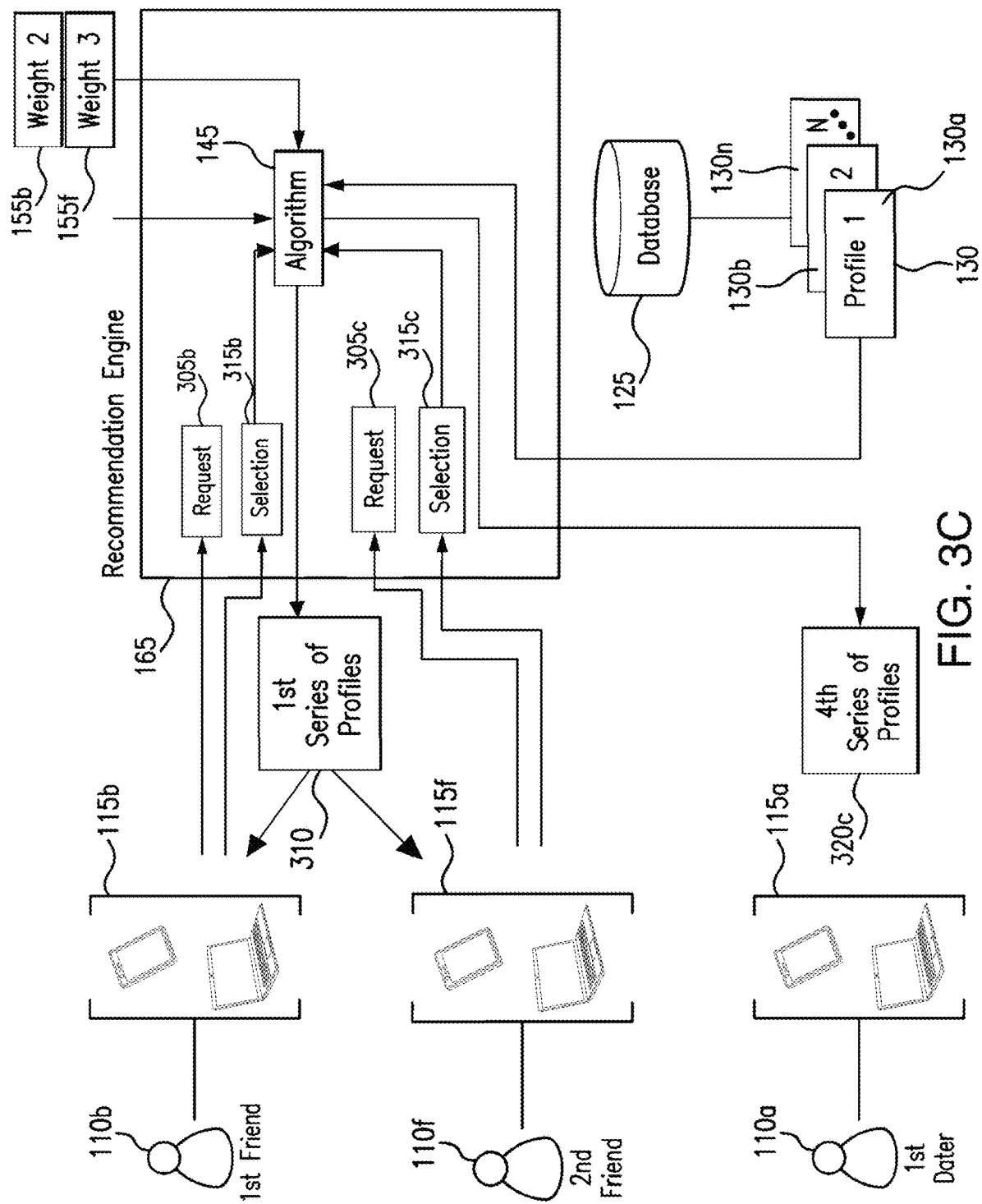

In certain embodiments, once dater 110a has registered with matching tool 105, recommendation engine 165 may generate recommendations of other potentially compatible daters 110 for dater 110a. FIGS. 3A through 3C illustrate examples of the behavior of recommendation engine 165 of matching tool 105, in response to transmitting recommendations of profiles 130 and receiving profile selections from dater 110a and/or one or more of friends 110b and 110f of dater 110a. FIG. 3A illustrates the behavior of recommendation engine 165 when presenting profile recommendations 310 for dater 110a to dater 110a, and FIGS. 3B and 3C illustrate examples of the behavior of recommendation engine 165 when presenting profile recommendations 310 for dater 110a to friends of dater 110a.

As illustrated, FIGS. 3A through 3C represent scenarios that may occur at a given point in time at which recommendation algorithm 145 is configured to generate first series of profile recommendations 310 for dater 110a. The scenario presented in FIG. 3A may occur if, in response to transmitting first series of profile recommendations 310, recommendation engine 165 receives selection 315a from dater 110a, prior to receiving any selections 315b and/or 315c from friends 110b and/or 110f of dater 110a. The scenario presented in FIG. 3B may occur if, in response to response to transmitting first series of profile recommendations 310, recommendation engine 165 receives selection 315b from first friend 110b, prior to receiving any selections 315a from dater 110a or any selections 315c from second friend 110f. The scenario presented in FIG. 3C may occur if, in response to transmitting first series of profile recommendations 310, recommendation engine 165 receives selection 315b from first friend 110b and selection 351c from second friend 110f, prior to receiving any selections 315a from dater 110a.

As mentioned above, FIG. 3A illustrates an example operation of recommendation engine 165 in response to receiving request 305a from dater 110a seeking recommendations of profiles 130, belonging to other daters 110 who are potentially compatible with dater 110a. As illustrated in FIG. 3A, in response to receiving request 305a, recommendation engine 165 uses recommendation algorithm 145 to generate a set of profile recommendations for dater 110a. For example, recommendation engine 165 may generate first series of profile recommendations 310. First series of profile recommendations 310 may include any number of profiles 130, belonging to daters 110 that recommendation engine 165 has determined may potentially be compatible with dater 110a. For example, in certain embodiments, first series of profile recommendations 310 may include an ordered set of dater profiles, {130g, 130h, 130i, 130j, 130k}, belonging, respectively, to daters 110g, 110h, 110i, 110j, and 110k, and ordered according to a predicted compatibility between each dater and dater 110a (e.g., the fact that profile 130g appears earlier in series 310 than profile 130h may indicate that matching algorithm 145 has predicted that dater 110a is likely more compatible with dater 110g than with dater 110h).

In response to receiving first series of profile recommendations 310, dater 110a may transmit one or more selections 315a from first series of profile recommendations 310, identifying profiles 130 belonging to daters 110 with whom dater 110a would like to be matched. For example, after viewing profiles 130g, 130h, 130i, 130j, and 130k, dater 110a may react favorably to the information contained in profile 130h, and, therefore, may wish to be matched with and/or communicate with dater 110h. Accordingly, dater 110a may transmit a selection 315a of profile 130h to matching tool 105. This disclosure contemplates that dater 110a may transmit selection 315a to matching tool 105 in any suitable manner. For example, in certain embodiments, dater 110a may transmit selection 315a to matching tool 105 by interacting with a button displayed by matching tool 105 on a display of device 115a, belonging to dater 110a. As another example, in certain embodiments, dater 110a may transmit selection 315a to matching tool 105 by gesturing on the display of device 115a.

In response to receiving selection 315a, recommendation algorithm 145 may be configured to use selection 315a to update the profile recommendations that recommendation engine 165 may transmit to dater 110a in the future. For example, in response to receiving selection 315a, recommendation algorithm 145 may be configured to transmit second series of profile recommendations 320a to dater 110a, where second series of profile recommendations 320a is different from first series of profile recommendations 310. As an example, in certain embodiments, second series of profile recommendations 320a will not include those profiles 130 selected by dater 110a, through selection 315a. As another example, in certain embodiments, second series of profile recommendations 320a will not include those profiles 130 from first series of profile recommendations 310 for which dater 110a may have indicated a negative preference. As a further example, in certain embodiments, second series of profile recommendations 320a may include new profiles 130, not present in first series of profile recommendations 310. Second series of profile recommendations 320a may also include a reordering of profiles 130, previously presented in first series of profile recommendations 310. This disclosure contemplates that the differences between first series of profile recommendations 310 and second series of profile recommendations 320a may arise as a result of selection 315a, made by dater 110a.

This disclosure contemplates that recommendation algorithm 145 may be any algorithm configured to generate recommendations of profiles 130 belonging to other daters 110 who are potentially compatible with dater 110a. As an example, in certain embodiments, recommendation algorithm 145 may be configured to generate profile recommendations 310 and 320a based at least in part on a comparison between features of profile 130a, belonging to dater 110a, and the features of profiles 130 belonging to other daters 110. For example, recommendation algorithm 145 may be configured to determine that dater 110a and dater 110g are likely compatible based at least in part on a high degree of similarity between profile information 230 provided by dater 110a and the profile information provided by dater 110g. Such profile information may, for example, indicate that both dater 110a and dater 110g are non-smokers who own dogs and enjoy hiking.

As another example, recommendation algorithm 145 may be configured to generate profile recommendations 320a based at least in part on previous selections 315a made by dater 110a. For example, recommendation algorithm 145 may be configured to learn from previous selections 315a, to identify those profile features that dater 110a finds desirable in potential matches. As a specific example, recommendation algorithm 145 may determine that dater 110a tends to select profiles 130 belonging to daters 130 that indicate that the daters 130 are more than six feet tall, non-religious, and like cats. Accordingly, recommendation algorithm 145 may place a greater importance on profiles 130 belonging to other daters 130 who similarly indicate through their profiles 130 that they are more than six feet tall, non-religious, and like cats, when determining daters 110 who are potentially compatible with dater 110a. As another example, recommendation algorithm 145 may be configured to analyze the photos provided in the profiles previously selected by dater 110a, to determine the physical qualities of other daters 110 that dater 110a finds most appealing. For example, recommendation algorithm 145 may determine that dater 110a tends to select profiles 130 that include pictures of daters with black hair who are playing the guitar. Accordingly, recommendation algorithm 145 may place a greater importance on profiles 130 that include photos of daters with black hair who are playing the guitar, as compared with other profiles 130, when determining daters 110 who are potentially compatible with dater 110a.

As another example, recommendation algorithm 145 may be configured to generate recommendations 320a based at least in part on previous selections 315a made by dater 110a as well as previous selections made by other daters 110. For example, recommendation algorithm 145 may be configured to generate recommended profiles 320a by identifying other daters 110 with similar matching tastes to dater 110a. For instance, recommendation algorithm 145 may determine that selections 315a made by dater 110a tend to be similar to the selections made by a different dater 110m. Therefore, recommendation algorithm 145 may determine that dater 110a and dater 110m have similar tastes in profiles 130. Accordingly, if dater 110m selects a profile 130 that dater 110a has not yet seen, recommendation algorithm 145 may present such profile to dater 110a under the assumption that a high probability exists that dater 110a will also select the profile.

As a further example, recommendation algorithm 145 may be configured to generate profile recommendations 320a based at least in part on the relative popularity of profile 130a, belonging to dater 110a, as compared with the popularity of other profiles 130, belonging to other daters 110. For example, recommendation algorithm 145 may group users 110 based on the number of times their profiles 130 have been selected by other users. This number may correspond to a relative attractiveness score (e.g., a profile 130 selected a large number of times may be assigned a higher attractiveness score than a profile 130 selected a smaller number of times). Recommendation algorithm 145 may then generate profile recommendations 310 and 320a by recommending to dater 110a those profiles 130 that belong to the same attractiveness grouping as profile 110a, belonging to dater 110a, under the assumption that people are more likely to match with people of similar attractiveness.

Recommendation engine 165 may be configured to transmit recommendations 310 not only to dater 110a, but also to friends of dater 110a, for selection therefrom. FIG. 3B illustrates an example of the behavior of recommendation engine 165 when presenting profile recommendations 310 for dater 110a to friend 110b of dater 110a.

As illustrated in FIG. 3B, in response to receiving request 305b from first friend 110b, asking for recommendations of profiles 130 belonging to other daters 110 who are potentially compatible with dater 110a, recommendation engine 165 uses recommendation algorithm 145 to generate first series of profile recommendations 310. This disclosure contemplates that recommendation engine 165 may transmit the same first series of profile recommendations 310 to friend 110b as recommendation engine 165 would transmit to dater 110a. As described above, first series of profile recommendations 310 may include an ordered set of dater profiles, {130g, 130h, 130i, 130j, 130k}, belonging, respectively, to daters 110g, 110h, 110i, 110j, and 110k, and ordered according to a predicted compatibility between each dater and dater 110a (e.g., recommendation engine 165 may present friend 110b with recommendations of those daters 110 that recommendation algorithm 145 has determined are most likely compatible with dater 110a, prior to presenting recommendations of other daters 110 that recommendation algorithm 145 has determined may be less compatible with dater 110a).

In response to receiving first series of profile recommendations 310, first friend 110b may transmit one or more selections 315b from first series of profile recommendations 310, identifying profiles 130 belonging to daters 110 with whom first friend 110b would like to see dater 110a matched. For example, after viewing profiles 130g, 130h, 130i, 130j, and 130k, first friend 110b may believe that dater 110a and dater 110i would make a good match. Accordingly, dater 110a may transmit a selection 315b of profile 130i to matching tool 105.

In response to receiving selection 315b from friend 110b, the behavior of recommendation algorithm 145 may depend on the permissions dater 110a has granted to friend 110b. As an example, permissions 150b may indicate that dater 110a has granted first friend 110b the permission to select profiles 130 to present as suggestions to dater 110a, but not to select profiles 130 as potential matches for dater 110a. Accordingly, in response to receiving selection 315b, recommendation algorithm 145 may be configured to reorder first series of profile recommendations 310 to form third series of profile recommendations 320b, placing profile(s) 130, associated with selection 315b, earlier in third series of profile recommendations 320b than in first series of profile recommendations 310. For example, if first friend 110b transmits a selection 315b of profile 130i to recommendation engine 165, recommendation algorithm 145 may transmit a third series of profile recommendations 320b to dater 110b that includes the same dater profiles 130 as first series of profile recommendations 310 (namely, profiles 130g, 130h, 130i, 130j, and 130k), but ordered to place profile 130i at the beginning of the series (e.g., the next time dater 110a requests that recommendation engine 165 transmit profile recommendations to dater 110a, recommendation engine 165 may present dater 110a with those profiles 130 suggested to dater 110a by friend 110b, prior to presenting other profiles 130 not suggested to dater 110a).

In certain embodiments, in response to receiving selection 315b from friend 110b, recommendation engine 165 may be configured to transmit a third series of profile recommendations 320b to dater 110b that includes an indication on profile 130, chosen by friend 110b as selection 315b, indicating that friend 110b has suggested profile 130 to dater 110a. For example, recommendation engine 165 may be configured to include a statement on the suggested profile 130 such as "friend 110b thinks that the two of you would make a great match," or any similar phrase indicating that friend 110b has suggested profile 130 to dater 110a. Where more than one friend 110b has suggested a given profile 130 to dater 110a, recommendation engine 165 may be configured to include an indication on the profile of the number of friends who have recommended the profile.

In some embodiments, permissions 150b may indicate that dater 110a has granted first friend 110b the permission to select profiles 130 as potential matches for dater 110a. Accordingly, in response to receiving selection 315b, recommendation engine 145 may be configured to use selection 315b to update the profile recommendations generated for dater 110a, in a similar manner as described above, in the scenario of FIG. 3A, in which recommendation engine received selection 315a from dater 110a. For example, in response to receiving selection 315b, recommendation algorithm 145 may be configured to transmit a third series of profile recommendations 320b to dater 110a, where third series of profile recommendations 320b is different from first series of profile recommendations 310. As an example, in certain embodiments, third series of profile recommendations 320b will not include those profiles 130 selected by friend 110b through selection 315b. As another example, in certain embodiments, third series of profile recommendations 320b will not include those profiles 130 from first series of profile recommendations 310 for which friend 110b may have indicated a negative preference. Alternatively, in some embodiments, third series of profile recommendations 320b may continue to include those profiles 130 from first series of profile recommendations 310 for which friend 110b may have indicated a negative preference, to provide dater 110a, him/herself, an opportunity to evaluate the profiles. As a further example, in certain embodiments, third series of profile recommendations 320b may include new profiles 130, not present in first series of profile recommendations 310. Third series of profile recommendations 320b may additionally include a reordering of profiles 130, previously presented in first series of profile recommendations 310.

This disclosure contemplates that third series of profile recommendations 320b may be different from second series of profile recommendations 320a. This difference may arise from the fact that friend 110b may have provided different selections 315b to recommendation engine than dater 110a, him/herself would have provided. For example, as described above, first friend 110b may have selected profile 130i, whereas dater 110a would have selected profile 130h. However, even if first friend 110b selected the same profile(s) 130 as dater 110a, him/herself would have selected, in certain embodiments, third series of profile recommendations 320b may nevertheless still be different from second series of profile recommendations 320a. This difference may arise as a result of the fact that recommendation algorithm 145 may apply different weights to the selections 315a and 315b made by dater 110a and friend 110b, respectively. For example, matching tool 105 may assign a first weight 155a to selections 315a made by dater 110a and a second weight 155b to selections 315b made by friend 110b, on behalf of dater 110a. Recommendation algorithm 145 may then use these weights 155 when generating new recommendations for dater 110a (e.g., second series of profile recommendations 320a and third series of profile recommendations 320b). For example, if weight 155a, assigned to dater 110a, is significantly larger than weight 155b, assigned to friend 110b, then selections 315a made by dater 110a may have a larger impact on the resulting profile recommendations 320a generated by recommendation algorithm 145 than the impact made by selections 315b on resulting profile recommendations 320b.

Matching tool 105 may determine weights 155 in any suitable manner. For example, in certain embodiments, matching tool 105 may assign higher weights 155a and 155c to daters 110a and 110c, as compared to friends 110b, 110d, 110e, and 110f, given that the daters are the ones that must ultimately approve of a match in order to form a successful dating relationship. As another example, in certain embodiments, matching tool 105 may assign weights 155 based on the relative selectivity of users 110. For example, matching tool 105 may assign a low weight 155 to a user who selects the majority of profiles 130 presented to him/her and a higher weight 155 to a user who selects only a portion of the profiles 130 presented to him/her. As another example, in certain embodiments, matching tool 105 may assign weights 155 based on the success of users 110 in generating matches for a given dater 110a. For example, matching tool 105 may assign a higher weight 155b to a friend 110b whose selections 315b tend to lead to matches (as described below, in the discussion of FIGS. 4A through 4C) more often than selections 315a, received from dater 110a. As a further example, in certain embodiments, matching tool 105 may assign weights 155 based not simply on the success of users 110 in generating matches for a given dater 110a, but also on the success of users 110 in generating successful matches for dater 110a. For example, in certain embodiments matching tool 105 may be configured to determine whether or not dater 110a met with his/her matches, and to solicit feedback from dater 110a and/or his/her matches to determine if the matches were successful. As a specific example, matching tool 105 may determine that dater 110a and dater 110c likely met in person, by monitoring a conversation between dater 110a and dater 110c. For instance, the conversation may indicate that dater 110a and dater 110c exchanged phone numbers and/or exchanged certain keywords and/or phrases indicative of users planning to meet with one another. In response to determining that dater 110a and dater 110c likely met in person, matching tool 105 may transmit surveys to dater 110a and dater 110c, asking the daters to evaluate one another. Matching tool 105 may assign a higher weight 155b to a friend 110b whose selections 315b tend to lead to successful matches (as determined based on the survey responses provided by dater 110a and his/her matches) more often than selections 315a, received from dater 110a.

FIG. 3C illustrates an example of the behavior of recommendation engine 165 when receiving selections 315 from multiple friends 110 of dater 110a. While this disclosure contemplates that recommendation engine 165 may receive selections 315 from any number of friends 110, for simplicity, FIG. 3C presents a situation in which recommendation engine 165 receives selection 315b from friend 110b and selection 315c from friend 110f.

Similar to the situation described above, in the discussion of FIG. 3B, the behavior of recommendation algorithm 145 in response to receiving selection 315b from friend 110b and selection 315c from friend 110f, the behavior of recommendation algorithm 145 may depend on the permissions dater 110a has granted to friend 110b and friend 110f. As an example, permissions 150b and 150f may indicate that dater 110a has granted both first friend 110b and second friend 110f permission to select profiles 130 to present as suggestions to dater 110a, but not to select profiles 130 as potential matches for dater 110a. Accordingly, in response to transmitting first series of profile recommendations 310 to both first friend 110b and second friend 110f, recommendation engine 165 may receive profile suggestions (in the form of selections 315) from both first friend 110b and second friend 110f. In certain embodiments, recommendation engine may generate a resulting series of profile recommendations 320c to transmit to dater 110a by placing an indication on each profile 130 selected by first friend 110b and/or second friend 110f, indicating that first friend 110b and/or second friend 110f has suggested the profile for dater 110a. In some embodiments, recommendation engine may generate a resulting series of profile recommendations 320c to transmit to dater 110a by reordering first series of profile recommendations 310 to place a suggested profile 130 at the beginning of the series, each time recommendation engine receives a selection 315 from first friend 110b or second friend 110f, suggesting a profile. For example, if recommendation engine 165 first receives selection 315b of profile 130k from first friend 110b, recommendation engine 165 may reorder first series of profile recommendations 310 from {130g, 130h, 130i, 130j, 130k} to {130k, 130g, 130h, 130i, 130j}. If recommendation engine 165 next receives selection 315c of profile 130j from second friend 110b, recommendation engine 165 may further reorder first series of profile recommendations to {130j, 130k, 130g, 130h, 130i}. Recommendation engine 165 may then transmit this reordered series of profile recommendations to dater 110a as fourth series of profile recommendations 320c.

In certain embodiments in which recommendation engine 165 uses suggestions 315b and 315c to generate a reordered series of profile recommendations 320c to transmit to dater 110a, recommendation engine 165 may reorder first series of profile recommendations 310 according to weights 155b and 155f assigned to friends 110b and 110f, respectively (and accordingly, assigned to the selections 315b and 315c received from friends 110b and 110f). In such embodiments, weights 155 may be used to determine the relative movement prescribed by recommendation engine 165 to a profile specified by selection 315, when reordering the profiles presented in first series of profile recommendations 310, to generate profile recommendations 320c. For example, if a higher weight 155b is assigned to selection 315b of profile 130k than weight 155c, assigned to selection 315c of profile 130j, recommendation engine 165 may reorder first series of profile recommendations 310 to place profile 130k earlier in the resulting series than profile 130j (e.g., recommendation engine 165 may assign a large movement to profile 130k and a smaller movement to profile 130j). For example, recommendation engine 165 may reorder first series of profiles recommendations 310 from {130g, 130h, 130i, 130j, 130k} to {130k, 130g, 130h, 130j, 130i}, and transmit this reordered series of profile recommendations to dater 110a as fourth series of profile recommendations 320c. In this manner, recommendation engine 165 may present dater 110a with those profiles 130 suggested by friend 110b prior to presenting dater 110a with those profiles 130 suggested by friend 110f. In certain embodiments, the weights 155 assigned to friends 110b and 110f may correspond directly with the size of the movement that recommendation engine 165 may give to the profiles 130 selected by friends 110b and 110f, when reordering first series of profile recommendations 310. For example, a value of 1 for weight 155b may indicate that profiles 130 suggested for dater 110a by first friend 110b are to be moved up one location in the reordered series of profile recommendations 320c to be sent to dater 110a, as compared with their locations in first series of profile recommendations 310. Similarly, a value of 5 for weight 155f may indicate that the profiles 130 suggested for dater 110a by second friend 110f are to be moved up five locations in the reordered series of profile recommendations 320c, as compared with their locations in first series of profile recommendations 310.

Matching tool 105 may determine weights 155 in any suitable manner. As an example, in certain embodiments, matching tool 105 may assign weights 155 based on the relative selectivity of friends 110b and 110f. For example, matching tool 105 may assign a low weight 155b to friend 110b if friend 110b tends to select the majority of profiles 130 presented to him/her and a higher weight 155f to friend 110f if friend 110f tends to select a smaller portion of the profiles 130 presented to him/her. As another example, in certain embodiments matching tool 105 may assign weights 155 based on the relative success of the suggestions made by friend 110b as compared with friend 110f. For example, if dater 110a tends to select a majority of the suggestions made by friend 110b, matching tool 105 may assign a high weight 155b to friend 110b. On the other hand, if dater 110a tends to reject a majority of the suggestions made by friend 110f, matching tool 105 may assign a low weight 155f to friend 110f. As a further example, in certain embodiments, matching tool 105 may assign weights 155 based not simply on the success of users 110 in generating matches for a given dater 110a, but also on the success of users 110 in generating successful matches for dater 110a. For example, in certain embodiments matching tool 105 may be configured to determine whether or not dater 110a met with his/her matches, and to solicit feedback from dater 110a and/or his/her matches to determine if the matches were successful. As a specific example, matching tool 105 may determine that dater 110a and dater 110c likely met in person, by monitoring a conversation between dater 110a and dater 110c. For instance, the conversation may indicate that dater 110a and dater 110c exchanged phone numbers and/or exchanged certain keywords and/or phrases indicative of users planning to meet with one another. In response to determining that dater 110a and dater 110c likely met in person, matching tool 105 may transmit surveys to dater 110a and dater 110c, asking the daters to evaluate one another. Matching tool 105 may assign a higher weight 155b to a friend 110b whose selections 315b tend to lead to successful matches (as determined based on the survey responses provided by dater 110a and his/her matches) more often than selections 315c, received from friend 110f.

In certain embodiments, rather than generating a reordered series of profile recommendations in response to receiving suggestions from friends 110b and/or 110f, matching tool 105 may use the suggestions to generate a leaderboard of the suggested profiles 130. For example, matching tool 105 may generate a leaderboard that lists the ten profiles 130 that have obtained the greatest number of suggestions from dater 110a's friends. Generating such a leaderboard may be desirable in certain embodiments in which dater 110a is a famous individual, with a very large list of friends and/or team/group.

In some embodiments, permissions 150b and 150f may indicate that dater 110a has granted both first friend 110b and second friend 110f permission to select profiles 130 as potential matches for dater 110a. In such embodiments, in response to receiving selections 315b and 315c, recommendation engine 145 may be configured to use both selections 315b and 315c to update the profile recommendations generated for dater 110a, in a similar manner as described above, in the scenario of FIG. 3B, in which recommendation engine received selection 315b from friend 110b. For example, in response to receiving selections 315b and 315c, recommendation algorithm 145 may be configured to transmit fourth series of profile recommendations 320c to dater 110a, where fourth series of profile recommendations 320c is different from first series of profile recommendations 310. As an example, in certain embodiments, fourth series of profile recommendations 320c will not include those profiles 130 selected by friend 110b through selection 315b and by friend 110f through selection 315c. As another example, in certain embodiments, fourth series of profile recommendations 320c will not include those profiles 130 from first series of profile recommendations 310 for which friend 110b and/or friend 110f may have indicated a negative preference. Alternatively, in some embodiments, fourth series of profile recommendations 320c may continue to include those profiles 130 from first series of profile recommendations 310 for which friend 110b and/or friend 110f may have indicated a negative preference, to provide dater 110a, him/herself, an opportunity to evaluate the profiles. As a further example, in certain embodiments, fourth series of profile recommendations 320c may include new profiles 130, not present in first series of profile recommendations 310. Fourth series of profile recommendations 320c may additionally include a reordering of profiles 130, Previously Presented in first series of profile recommendations 310. This disclosure contemplates that recommendation algorithm 145 may place a different weight on selection 315b, received from friend 110b, as compared with selection 315c, received from friend 110c, when determining fourth series of profile recommendations 320c. For example, recommendation algorithm 145 may determine fourth series of profile recommendations 320c based at least in part on selection 315b, received from friend 110b, weight 155b, assigned to friend 110b, selection 315c, received from friend 110f, and weight 155f, assigned to friend 110f, where weights 155b and 155f may be determined as described above.

In certain embodiments, permissions 150b may indicate that dater 110a has granted first friend 110b permission to select profiles 130 to present as suggestions to dater 110a, but not to select profiles 130 as potential matches for dater 110a, while permissions 150f may indicate that dater 110a has granted second friend 110f permission to select profiles 130 as potential matches for dater 110a. In such embodiments, recommendation algorithm 145 may determine fourth series of profile recommendations 320c by taking into account both the suggestions provided by first friend 110b and the selections of potential matches provided by second friend 110f, as each described, individually, above.

Recommendation engine 165 may be a software module stored in memory 140 and executed by processor 135. An example algorithm for recommendation engine 165 is as follows: (1) receive a request 305 for profile recommendations from first dater 110a, first friend 110b of first dater 110a, and/or second friend 110f of first dater 110a; (2) transmit first series of profile recommendations 310 to the user 110 who submitted request 305; (3) receive a selection 315 of a profile 130 recommended in first series of profiles recommendations 310, from the user 110 who submitted request 305; (4) determine, using algorithm 145, based at least on the selection 315 and a weight 155 assigned to user 110, a new series of profile recommendations 320; (5) transmit the new series of profile recommendations 320 to dater 110a. While the above example presents one possible algorithm for recommendation engine 165, this disclosure contemplates that recommendation engine 165 may use any algorithm operable to generate and transmit recommendations of profiles 130 to users 110. For example, the algorithm used by recommendation engine 165 may include modifications, additions, or omissions to the example algorithm presented above. Furthermore, the algorithm used by recommendation engine 165 may include more, fewer, or other steps as compared with the example algorithm presented above, and the steps may be performed in parallel or in any suitable order.

While FIGS. 3A through 3C illustrate recommendation engine 165 generating recommendations 310 and 320 of profiles 130 for dater 110a, as well as transmitting such recommendations to dater 110a, first friend 110b, and second friend 110f, this disclosure contemplates that recommendation engine 165 may generate recommendations 310 and 320 and transmit such recommendations to any number of users 110. Furthermore, this disclosure contemplates that modifications, additions, or omissions may be made to recommendation engine 165 without departing from the scope of the invention. For example, this disclosure contemplates that some or all of the operations described above as being performed by recommendation engine 165 may be performed by other components of matching tool 105. Such components may be integrated or separated. Furthermore, the operations may be performed using any suitable logic comprising software, hardware, and/or other logic.

Figure 4A:
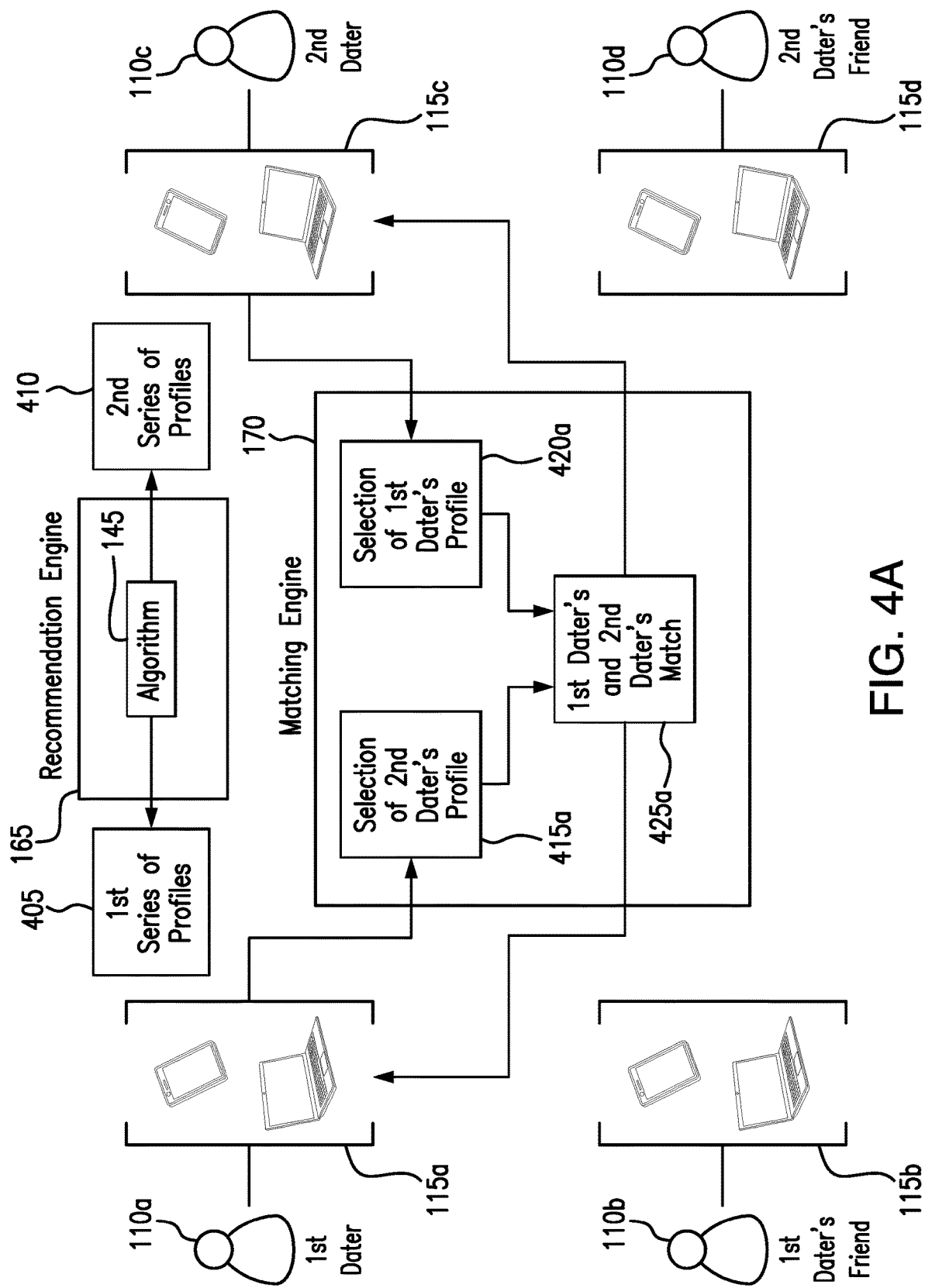
FIGS. 4A through 4C illustrate examples of the behavior of the matching engine of the matching tool of the system of FIG. 1, in response to receiving profile selections from a dater or one of the dater's friends.
Figure 4B:
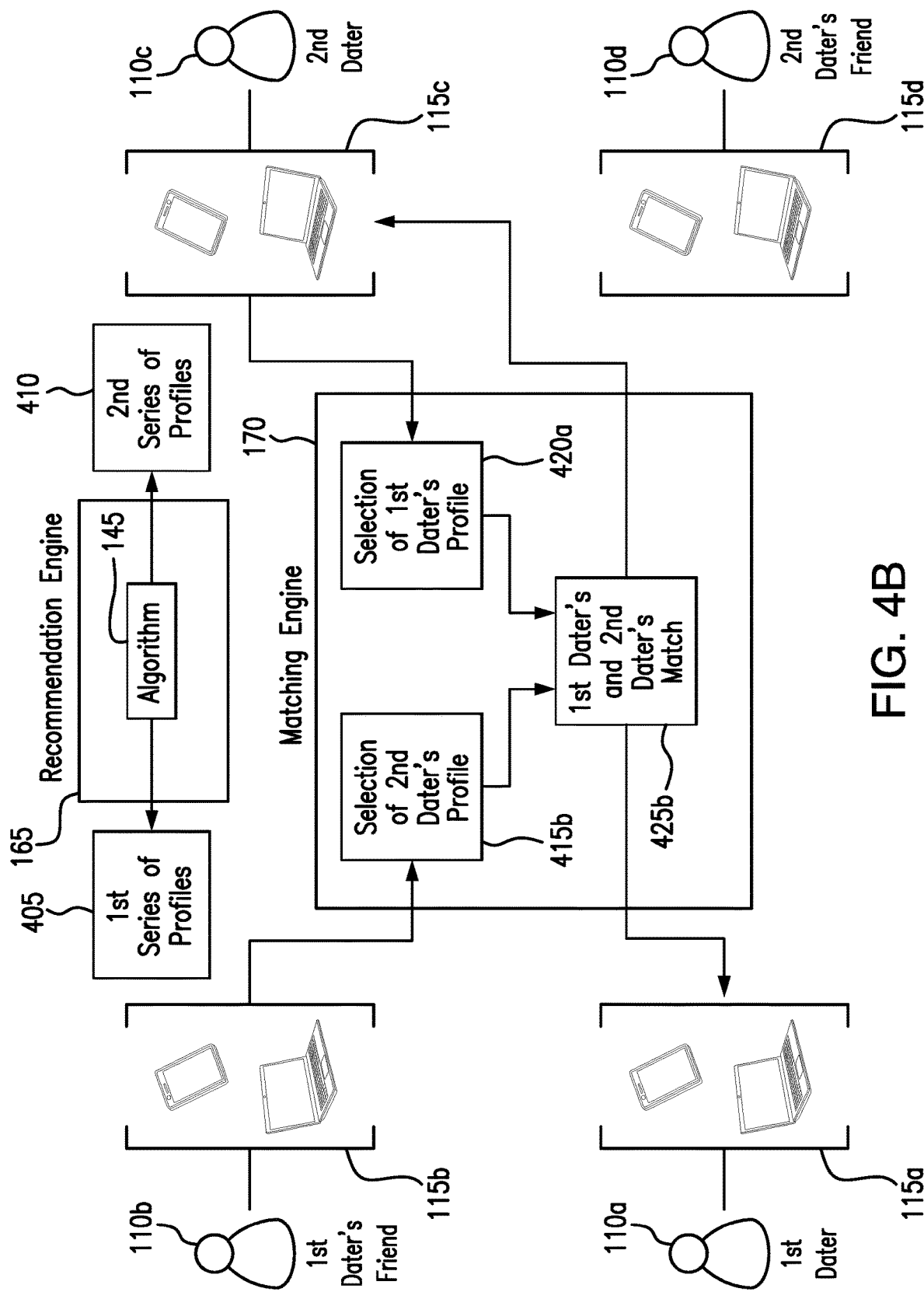
Figure 4C:
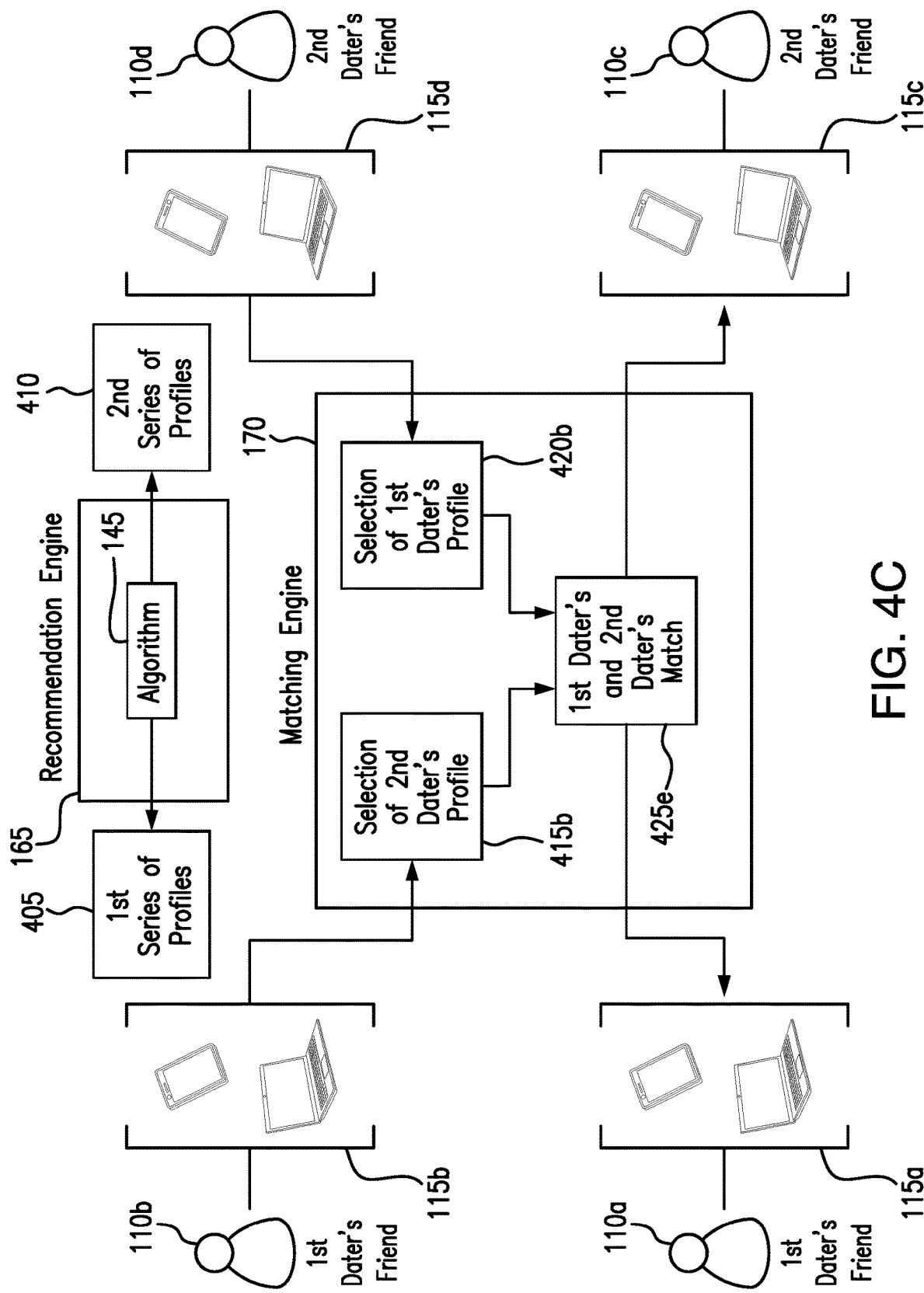

FIGS. 4A through 4C present examples illustrating the process by which matching engine 170 of matching tool 105 generates matches between first dater 110a and second dater 110b. FIG. 4A illustrates an example embodiment where daters 110 match with other daters 110 by providing positive preference indications in response to viewing profiles 130 of other daters 110 with whom them would like to be matched. FIGS. 4B and 4C illustrate example embodiments where matching tool 105 may enable friends 110b and 110d of daters 110a and 110c to match on behalf of the daters 110a and 110c with whom they are friends.

FIG. 4A illustrates the process by which matching engine 170 generates a match 425 between first dater 110a and second dater 110b, based on selections 415a and 420a provided by first dater 110a and second dater 110b, respectively. As illustrated in FIG. 4A, recommendation engine 165 may use recommendation algorithm 145 to generate first series of profile recommendations 405 to transmit to first dater 110a. First series of profile recommendations 405 may include profile 130c, belonging to second dater 110b. Similarly, recommendation engine 165 may use recommendation algorithm 145 to generate second series of profile recommendations 410 to transmit to second dater 110b. Second series of profile recommendations 410 may include profile 130a, belonging to first dater 110a.

In response to receiving first series of profile recommendations 405, first dater 110a may select one or more profiles 130 presented in first series of profile recommendations 405, to indicate that first dater 110a is interested in matching with the daters 110 to whom profiles 130 belong. For example, first dater 110a may transmit selection 415a of profile 130c, belonging to second dater 110c, to matching engine 170 to indicate that first dater 110a is interested in matching with second dater 110c. Similarly, in response to receiving second series of profile recommendations 410, second dater 110c may select one or more profiles 130 presented in second series of profile recommendations 410, to indicate that second dater 110c is interested in matching with the daters 110 to whom profiles 130 belong. For example, second dater 110c may transmit selection 420a of profile 130a, belonging to first dater 110a, to matching engine 170, to indicate that second dater 110c is interested in matching with first dater 110a.

Matching engine 170 is configured to compare selections 415a and 420a, received from first dater 110a and second dater 110c, to determine whether or not to generate any matches for first dater 110a and second dater 110c. For example, matching engine 170 is configured to generate match 425a between first dater 110a and second dater 110c, by determining that first dater 110a selected profile 130c, belonging to second dater 110c, and second dater 110c selected profile 130a, belonging to first dater 110a. Once matching engine 170 has generated match 425a between first dater 110a and second dater 110c, matching engine 170 may move profile 110c, belonging to second dater 110c, from first series of profiles 405 to a list of matches for first dater 110a. Similarly, matching engine 170 may move profile 110a, belonging to first dater 110a, from second series of profiles 410 to a list of matches for second dater 110c. Chatting engine 180 may also enable communication between first dater 110a and second dater 110c, as described in further detail below, in the discussion of FIG. 6.

FIG. 4B presents an example in which friend 110b of first dater 110a is able to generate match 425b between first dater 110a and second dater 110c. As illustrated in FIG. 4B, recommendation engine 165 may transmit first series of profiles 405 to friend 110b of first data 110a. As described above, first series of profiles 405 may include profile 130c, belonging to second dater 110c. Provided that first dater 110a has granted friend 110b permission to generate matches on his/her behalf, friend 110b may select profile 130c from amongst the profiles 130 presented in first series of profiles 405. For example, friend 110b may select profile 130c in response to viewing profile 130c and determining that dater 110c, to whom profile 130c belongs, would likely make a good match with dater 110a. Friend 110b may then transmit his/her selection of profile 130c to matching engine 170, as selection 415b. Matching engine 170 may then generate match 425b between first dater 110a and second dater 110c, in response to determining that second dater 110c selected profile 130a, belonging to first dater 110a, in response to receiving second series of profiles 410, which included profile 130a.

FIG. 4C presents an example in which friend 110b of first dater 110a and friend 110d of second dater 110c are able to generate match 425c between first dater 110a and second dater 110c. As illustrated in FIG. 4C, recommendation engine 165 may transmit second series of profile 410 to friend 110d of second dater 110c. As described above, second series of profiles 410 may include profile 130a, belonging to first dater 110a. Provided that second dater 110c has granted friend 110d permission to generate matches on his/her behalf, friend 110d may select profile 130a from amongst the profiles 130 presented in second series of profiles 410. For example, friend 110d may select profile 130a in response to viewing profile 130a and determining that dater 110a, to whom profile 130a belongs, would likely make a good match with dater 110c. Friend 110d may then transmit his/her selection of profile 130a to matching engine 170, as selection 420b. Matching engine 170 may then generate match 425c between first dater 110a and second dater 110c in response to determining that friend 110b of first dater 110a selected profile 130c, belonging to second dater 110c, in response to receiving first series of profiles 405, which included profile 130c.

Matching engine 170 may be a software module stored in memory 140 and executed by processor 135. An example algorithm for matching engine 170 is as follows: (1) receive selection 415 from first dater 110a or friend 110b of first dater 110a; (2) receive selection 420 from second dater 110c or friend 110d of second dater 110c; (3) determine whether selection 415 includes profile 130c, belonging to second dater 110c; (4) determine whether selection 420 includes profile 130a, belonging to first dater 110a; (5) if selection 415 includes profile 130c and selection 420 includes profile 130a, generate match 425 between first dater 110a and second dater 110c and transmit match 425 to first dater 110a and second dater 110c; and (6) if selection 415 does not include profile 130c and/or selection 420 does not include profile 130a, do not generate match 425 between first dater 110a and second dater 110c. While the above example presents one possible algorithm for matching engine 170, this disclosure contemplates that matching engine 170 may use any algorithm operable to generate matches between users 110. For example, the algorithm used by matching engine 170 may include modifications, additions, or omissions to the example algorithm presented above. Furthermore, the algorithm used by matching engine 170 may include more, fewer, or other steps as compared with the example algorithm presented above, and the steps may be performed in parallel or in any suitable order.

While FIGS. 4A through 4C illustrate matching engine 170 generating matches 425 between first dater 110a and second dater 110c, based a comparison between input from first dater 110a and/or friend 110b of first dater 110a, and input from second dater 110c and/or friend 110d of second dater 110c, this disclosure contemplates that matching engine 170 may generate matches between any number of users 110, in any suitable manner, based on input from the users 110 and/or any number of other users. Furthermore, this disclosure contemplates that modifications, additions, or omissions may be made to matching engine 170 without departing from the scope of the invention. For example, this disclosure contemplates that some or all of the operations described above as being performed by matching engine 170 may be performed by other components of matching tool 105. Such components may be integrated or separated. Furthermore, the operations may be performed using any suitable logic comprising software, hardware, and/or other logic.

In certain embodiments, matches 425b (of FIG. 4B) and 425c (of FIG. 4C), generated by at least one of friends 110b and 110d may be indistinguishable from match 425a (of FIG. 4A) generated entirely by daters 110a and 110c, themselves. For example, when first dater 110a receives match 425c between him/herself and second dater 110c, first dater 110a may be unaware that friend 110d of dater 110b selected his/her profile, rather than dater 110*b* him/herself. On the other hand, in some embodiments, match 425 may include an indication of the user 110 who helped generate the match. For example, match 425*c*, generated according to the process illustrated in FIG. 4C, may indicate to first dater 110*a* that it was a friend of second dater 110*c* who thought that first dater 110*a* and second dater 110*c* should be matched.

In certain embodiments, daters 110*a* and 110*c* may be permitted to override selections 415*b* and 420*b* submitted to matching engine 170 by friends 110*b* and 110*d*, respectively. For example, daters 110*a* and 110*c* may be permitted to view selections 415*b* and 420*b* and to cancel any selections that they do not approve of. In some embodiments, daters 110*a* and 110*c* may not be permitted to override any selections 415*b* and 420*b* submitted to matching engine 170. In certain embodiments, daters 110*a* and 110*c* may be permitted to un-match with any of the daters that a friend has matched them with. For example, in response to viewing match 425*b* or 425*c*, generated based on selection 415*b* made by friend 110*b*, and determining that he/she does not want to be matched with second dater 110*c*, first dater 110*a* may remove match 425*b* or 425*c* from his/her list of matches, thereby unmatching with second dater 110*c*.

In certain embodiments, matching engine 170 may be configured to generate matches between groups of daters. For example, first dater 110*a* may generate a first group of daters from certain members of his/her friend list and/or team/group. This first group of daters may include first dater 110*a*, third dater 110*g*, and fourth dater 110*h*, for example. In certain embodiments, the members of the group may (1) assign a name to their group, (2) create an icon for their group, and/or (3) include any sort of distinguishing feature to identify the group. Once a group of daters has been created, the group may act collectively, as a unit, to select other groups of daters in the hopes of generating a group-based match. For example, the first group of daters may select a second group of daters that includes, for example, second dater 110*c*, fifth dater 110*i*, and sixth dater 110*j*. If this second group of daters similarly selects the first group of daters, then matching engine 170 may generate a match between the first group of daters and the second group of daters. Such a match may enable the members of the first group of daters and the members of the second group of daters to communicate with one another in a group chat generated by chatting engine 180. This aspect of matching tool 105 is described in further detail above, in the discussion of FIG. 1.

Figure 5:
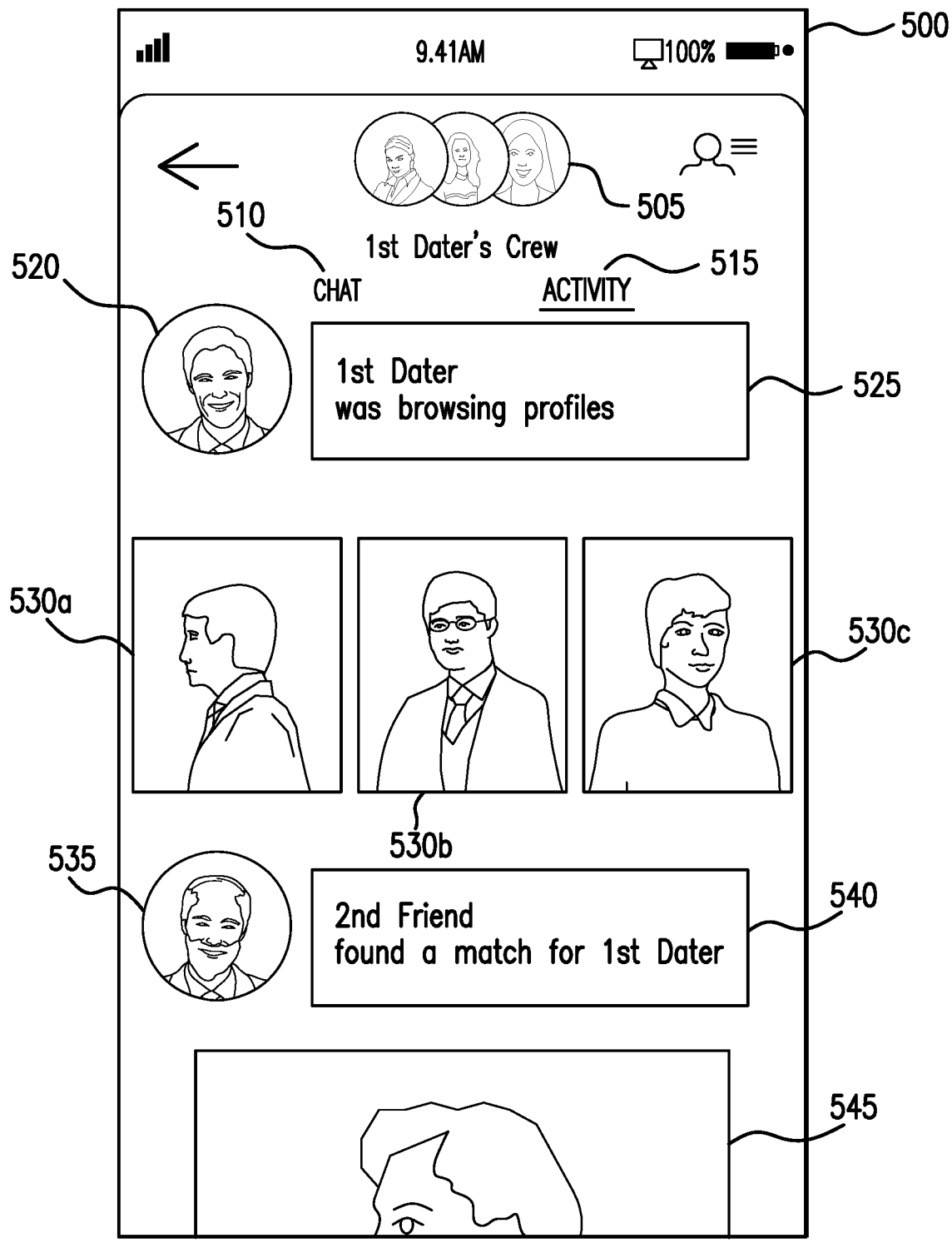
FIG. 5 presents an example activity feed generated by the feed generator of the matching tool of the system of FIG. 1.

FIG. 5 presents an example activity feed 500, generated by feed generator 175 and associated with a given dater 110*a*. FIG. 5 illustrates activity feed 500 as displayed on device 115*a* of dater 110*a*. However, this disclosure contemplates that activity feed 500, associated with dater 110*a*, may also be displayed on device 115*b* of friend 110*b*. In certain embodiments, activity feed 500 may illustrate the actions taken by a dater 110*a* as well as his/her friends 110*b*, while interacting with matching tool 105. In this manner, activity feed 500 may enable matching tool 105 to further involve a dater's friends in the online dating experience, as well as to notify the dater of the actions taken by his/her friends on his/her behalf.

In certain embodiments, and as illustrated in FIG. 5, activity feed 500 may be a "team-centric" activity feed. For example, feed generator 175 may generate and display activity feed 500 for dater 110*a* as well as for each member of dater 110*a*'s team/group and/or each member of dater 110*a*'s friend list, where activity feed 500 illustrates the activities performed by dater 110*a* as well as the activities performed by each member of dater 110*a*'s team/group and/or friend list on behalf of dater 110*a*. In certain embodiments in which dater 110*a* has more than one team/group and/or is a member of another dater's team/group and/or friend list, dater 110*a* may receive multiple activity feeds 500, where each activity feed is associated with a different team/group and/or friend list. Dater 110*a* may then be able to switch between the multiple activity feeds 500, generated by feed generator 175, depending on which team/group and/or friend list he/she would like to view activity for, at a given point in time. Similarly, when a user 110*b* is a member of dater 110*a*'s team/group and/or friend list and is also a member of another dater's team/group and/or friend list, user 110*b* may alternatively view a separate activity feed 500 for each team/group and/or friend list to which he/she is a member. As illustrated in FIG. 5, in certain embodiments, activity feed 500 may display an indication 505 of the team/group and/or dater 110 to which activity feed 500 is directed. For example, indication 505, depicted in FIG. 5, indicates that activity feed 500 is directed to the activities of the members of first dater 110*a*'s team/group.

In certain embodiments, any activity that user 110 performs as a member of dater 110*a*'s team/group and/or friend list may appear in the activity feed 500 associated with that team/group and/or friend list. As an example, activity feed 500 may indicate that dater 110*a* selected one or more profiles 130. For example, as illustrated in FIG. 5, activity feed 500 may display profile picture 520, belonging to dater 110*a*, along with message 525 stating that "1st dater was perusing profiles," or any similar phrase to indicate that first dater 110*a* was selecting profiles 130 from amongst a series of profile recommendations generated and presented to first dater 110*a* by recommendation engine 165. Activity feed 500 may further display profile pictures 530*a*, 530*b*, and 530*c*, from the profiles 130 selected by first dater 110*a*. As another example, activity feed 500 may indicate that friend 110*f* of first dater 110*a* generated a match for first dater 110*a* (e.g., friend 110*f* selected profile 130*c*, belonging to second dater 110*c*, and second dater 110*c* or a member of second dater 110*c*'s team/group and/or friend list also selected profile 130*a* belonging to first dater 110*a*). For example, as illustrated in FIG. 5, activity feed 500 may display profile picture 535, belonging to friend 110*f*, along with message 540 stating that "2nd friend found a match for 1st dater," or any similar phrase to indicate that a selection of profile 130*c* by friend 110*f* resulted in a match between first dater 110*a* and second dater 110*c*.

Further examples of the activities performed by members of dater 110*a*'s team/group and/or friend list (including activities performed by dater 110*a* him/herself) which may be displayed in activity feed 500 include: (1) when dater 110*a* receives a message from one of his/her matches; (2) when dater 110*a* sends a message to one of his/her matches; (3) when friend 110*b* messages one of dater 110*a*'s matches on dater's 110*a* behalf; (4) when dater 110*a* sends/receives a message from a member of his/her friend list and/or team/group; (5) when friend 110*b* suggests a profile 130 to dater 110*a*; and/or (6) any other activities that may be performed by members of dater 110*a*'s team/group and/or friend list.

In certain embodiments, despite the fact that activity feed 500 may be a "team-centric" activity feed, the version of activity feed 500 presented to dater 110*a* may be different from the version of activity feed 500 presented to friend 110*b*, who is a member of dater 110*a*'s team/group and/or friend list. Such differences may arise due to permissions 150 set for friend 110b. For example, dater 110a may not want friend 110b to know each time dater 110a begins a conversation with one of his matches. Accordingly, dater 110a may set permissions 150b for friend 110b to indicate that the activity feed 500 presented to friend 110b is not to display any indications when dater 110a begins a conversation with one of his matches. As another example, in certain embodiments, the version of activity feed 500 presented to dater 110a may be different from the version of activity feed 500 present to friend 110b of dater 110a as a result of permissions 150 set by other friends of dater 110a. For example, friend 110f of dater 110a may set permissions 150 such that only dater 110a may view the activities performed by friend 110f on behalf of dater 110a in activity feed 500. As described above, in addition to governing the information that may be presented on activity feed 500, permissions 150 may also specify the actions that friends 110 may take on behalf of dater 110a when interacting with matching tool 105.

Feed generator 175 may be a software module stored in memory 140 and executed by processor 135. An example algorithm for feed generator 175, used to generate a "team-centric" activity feed 500 is as follows: (1) for each member of dater 110a's team/group and/or friend list, determine that the member performed an activity on behalf of dater 110a, and add a description of the activity to activity feed 500; (2) generate a version of activity feed 500 for each member of dater 110a's team/group and/or friend list, by removing those activities from activity feed 500 that permissions 150 belonging to the member indicate that the member is not permitted to view; and (3) transmit each version of activity feed 500 to the associated member of dater 110a's team/group and/or friend list. While the above example presents one possible algorithm for feed generator 175, this disclosure contemplates that feed generator 175 may use any algorithm operable to generate feed 500, illustrating the activities of users 110. For example, the algorithm used by feed generator 175 may include modifications, additions, or omissions to the example algorithm presented above. Furthermore, the algorithm used by feed generator 175 may include more, fewer, or other steps as compared with the example algorithm presented above, and the steps may be performed in parallel or in any suitable order.

In certain embodiments, rather than generating a "team-centric" activity feed, feed generator 175 may generate a "user-centric" activity feed. For example, rather than generating multiple activity feeds 500 for each team/group and/or friend list belonging to user 110 and/or each team/group and/or friend list to which user 110 belongs, feed generator 175 may generate a single activity feed 500 for user 110. This single activity feed may include activities performed by user 110 as well as activities affecting user 110 and performed by any of the other users to which user 110 is connected by matching tool 105. In certain embodiments, user-centric activity feed 500 may additionally include friend-of-a-friend activities. For example, consider a situation in which both user 110b and user 110f are friends of dater 110a, but are not connected with one another through matching tool 105 (e.g., user 110b is not a member of user 110f's team/group and/or friend list and user 110f is not a member of user 110b's team/group and/or friend list). Activity feed 500 generated by feed generator 175 for user 110b may nevertheless include activities performed by user 110f on behalf of dater 110a, given dater 110a's connection with user 110b. Similarly, activity feed 500 generated by feed generator 175 for user 110f may include activities performed by user 110b on behalf of dater 110a, given dater 110a's connection with user 110f. In such embodiments, users 110b and 110f may be able to control whether the activities they perform on behalf of dater 110a appear in one another's activity feeds 500, through permissions 150. For example, user 110b may be able to set permissions 150 for friends-of-friends through a privacy setting offered by matching tool 105.

An example algorithm for feed generator 175, used to generate a "user-centric" activity feed 500 for user 110 is as follows: (1) determine that user 110 performed an activity using matching tool 105 and add a description of the activity to activity feed 500; (2) determine that a member of user 110's team/group and/or friend list performed an activity on behalf of user 110 and add a description of the activity to activity feed 500; (3) determine that a member of a given dater's team/group and/or friend list, to which user 110 is also a member, performed an activity on behalf of the dater; (4) determine whether the member of the team/group and/or friend list has set a privacy setting offered by matching tool 105 to allow friend-of-a-friend activity sharing; (5) if the member of the team/group and/or friend list has set the privacy setting to allow friend-of-a-friend activity sharing, add a description of the activity performed by the member of the team/group and/or friend list on behalf of the dater to activity feed 500; and (6) transmit activity feed 500 to user 110. While the above example presents one possible algorithm for feed generator 175, this disclosure contemplates that feed generator 175 may use any algorithm operable to generate feed 500, illustrating the activities of users 110. For example, the algorithm used by feed generator 175 may include modifications, additions, or omissions to the example algorithm presented above. Furthermore, the algorithm used by feed generator 175 may include more, fewer, or other steps as compared with the example algorithm presented above, and the steps may be performed in parallel or in any suitable order.

Figure 6:
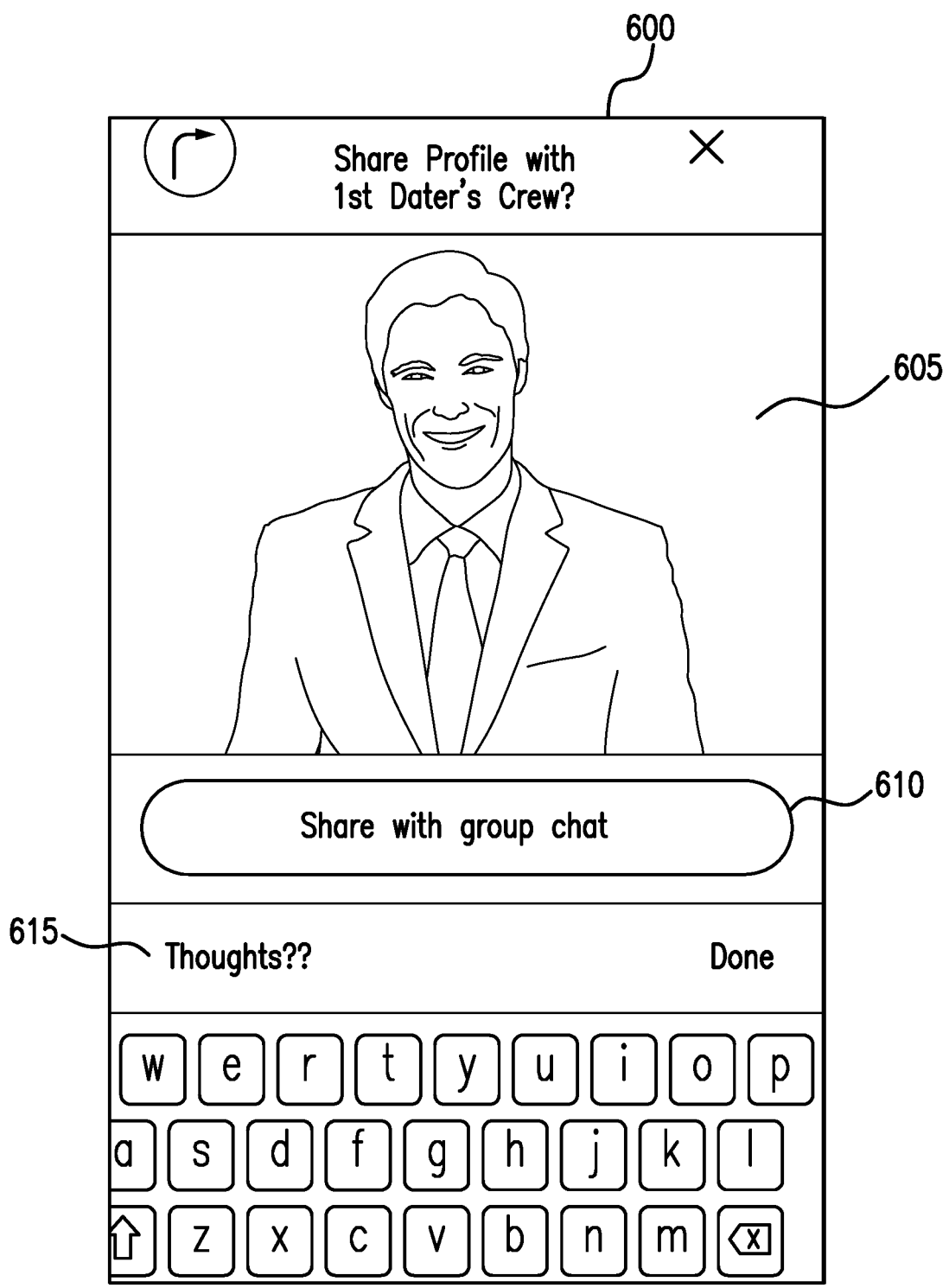
FIG. 6 presents an example of a graphical user interface generated by the chatting engine of the matching tool of the system of FIG. 1 and used by a user of the system to share another user's profile in a group chat.

FIG. 6 illustrates an example graphical user interface 600 associated with a group chat amongst friends of dater 110a, and displayed on device 115b, belonging to friend 110b. Graphical user interface 600 may be generated by chatting engine 180 (of FIG. 1), and may enable friends of dater 110a to share profiles 130 with both dater 110a and other friends of dater 110a and/or members of dater 110a's team/group, as illustrated in FIG. 6. For example, each profile 130 may include an interactive button through which a user 110 may select the profile to share in a group chat. In response to user 110 selecting profile 130 to share in a group chat, graphical user interface 600 may display profile picture 605, associated with profile 130, along with text box 615. User 110 may use text box 615 to input comments about profile 130 that he/she wishes to share with the other participants in the group chat. Once user 110 has finished inputting comments into text box 615, user 110 may then share both these comments and profile 130 with the other participants of the group chat by selecting butting 610.

In certain embodiments, in response to user 110 sharing profile 130 with the other participants of the group chat, one or more members of the group chat may be able to select profile 130 directly from the group chat. For example, dater 110a may select profile 130 directly from the group chat, indicating that dater 110a would like to be matched with the dater to whom profile 130 belongs. As another example, friend 110b may select profile 130 directly from the group chat, generating either a potential match for dater 110a or a suggestion for dater 110a, depending on permissions 150b provided to friend 110b by dater 110a.

In certain embodiments, in addition to enabling friends of dater 110a to share profiles 130 with one another, chatting engine 180 may be enable friends of dater 110a to share activities displayed in activity feed 500 with one another. As a specific example, in response to viewing on activity feed 500 that first friend 110b suggested profile 130c to dater 110a, second friend 110f may share this event in the group chat for dater 110a's team/group and/or friend list and comment that he/she approves of this suggestion.

In addition to enabling users 110 to share profiles 130 with one another in group chats, chatting engine 180 may facilitate any suitable form of communication between users 110, as described in further detail above, in the discussion of FIG. 1.

Figure 7:
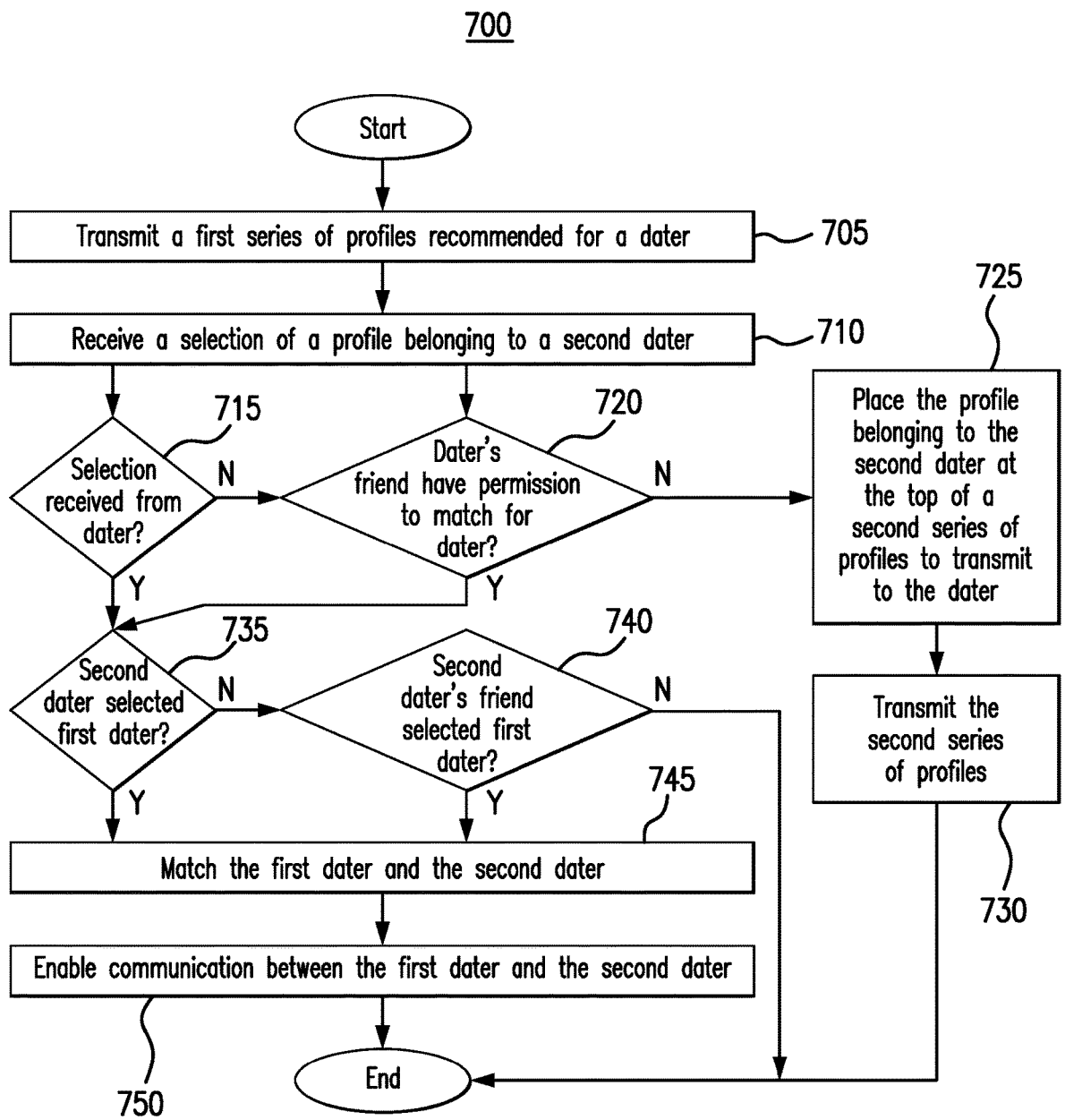
FIG. 7 presents a flowchart illustrating an example method by which the matching tool of the system of FIG. 1 may generate a match between a pair of daters in the system.

FIG. 7 presents a flowchart illustrating the method by which matching tool 105 may generate matches 425 between a pair of daters 110a and 110c.

In step 705 matching tool 105 (of FIG. 1) generates and transmits first series of profile recommendations 405. First series of profile recommendations 405 may include profiles 130 belonging to daters 110 that matching tool 105 has determined are likely compatible with first dater 110a. This disclosure contemplates that matching tool 105 may transmit first series of profile recommendations 405 to first dater 110a and/or a friend 110b of first dater 110a. In step 710 matching tool 105 receives a selection 415 of profile 130c, belonging to second dater 110c. In step 715 matching tool 105 determines whether selection 415 was received from first dater 110a or friend 110b of first dater 110a.

If, in step 715 matching tool 105 determines that selection 415 was received from first dater 110a, then in step 735 matching tool 105 determines whether the tool has received a selection 420 of profile 130a, belonging to first dater 110a, from second dater 110c. If, in step 735 matching tool 105 determines that the tool has received a selection 420 of profile 130a, belonging to first dater 110a, from second dater 110c, in step 745 matching tool 105 generates match 425 between first dater 110a and second dater 110c. In step 750 matching tool 105 enables communication between first dater 110a and second dater 110c.

If, in step 735 matching tool 105 determine that the tool has not received a selection 420 of profile 130a, belonging to first dater 110a, from second dater 110c, in step 740 matching tool 105 determines whether the tool has received a selection 420 of profile 130a from friend 110d of second dater 110c. If, in step 740 matching tool 105 determines that the tool has received a selection 420 of profile 130a from friend 110d of second dater 110c, in step 745 matching tool 105 generates match 425 between first dater 110a and second dater 110c and in step 750 matching tool 105 enables communication between first dater 110a and second dater 110c. On the other hand, if, in step 740 matching tool 105 determines that the tool has not received a selection 420 of profile 130a from friend 110d of second dater 110c, matching tool 105 does not generate a match between first dater 110a and second dater 110c.

If, in step 715 matching tool 105 determines that selection 415 was received from friend 110b of first dater 110a, then in step 720, matching tool 105 determines whether friend 110b has been granted permission by first dater 110a to select potential matches for first dater 110a. If, in step 720 matching tool 105 determines that friend 110b has been granted permission by first dater 110a to select potential matches for first dater 110a, the method proceeds to step 735, and continues from step 735 as described above.

If, in step 720 matching tool 105 determines that friend 110b has not been granted permission by first dater 110a to select potential matches for first dater 110a, then, in step 725 matching tool 105 treats selection 415 from friend 110b as a suggestion for dater 110a. Accordingly, matching tool 105 reorders the profiles 130 in first series of profile recommendations 405 into a second series of profile recommendations, in which profile 130c, belonging to dater 110c, is placed earlier in the series than in first series of profile recommendations 405. For example, matching tool 105 may reorder the profiles 130 in first series of profile recommendations 405 into the second series of profile recommendations by placing profile 130c at the beginning of the second series of profile recommendations. Additionally, matching tool 105 may place an indication on profile 130c that friend 110b has suggested profile 130c for first dater 110a. In step 730 matching tool 105 transmits the second series of profile recommendations to first dater 110a for selection therefrom.

Modifications, additions, or omissions may be made to method 700 depicted in FIG. 7. Method 700 may include more, fewer, or other steps. For example, steps may be performed in parallel or in any suitable order. While discussed as matching tool 105 (or components thereof) performing the steps, any suitable component of system 100, such as device(s) 115 for example, may perform one or more steps of the method.

Figure 8:
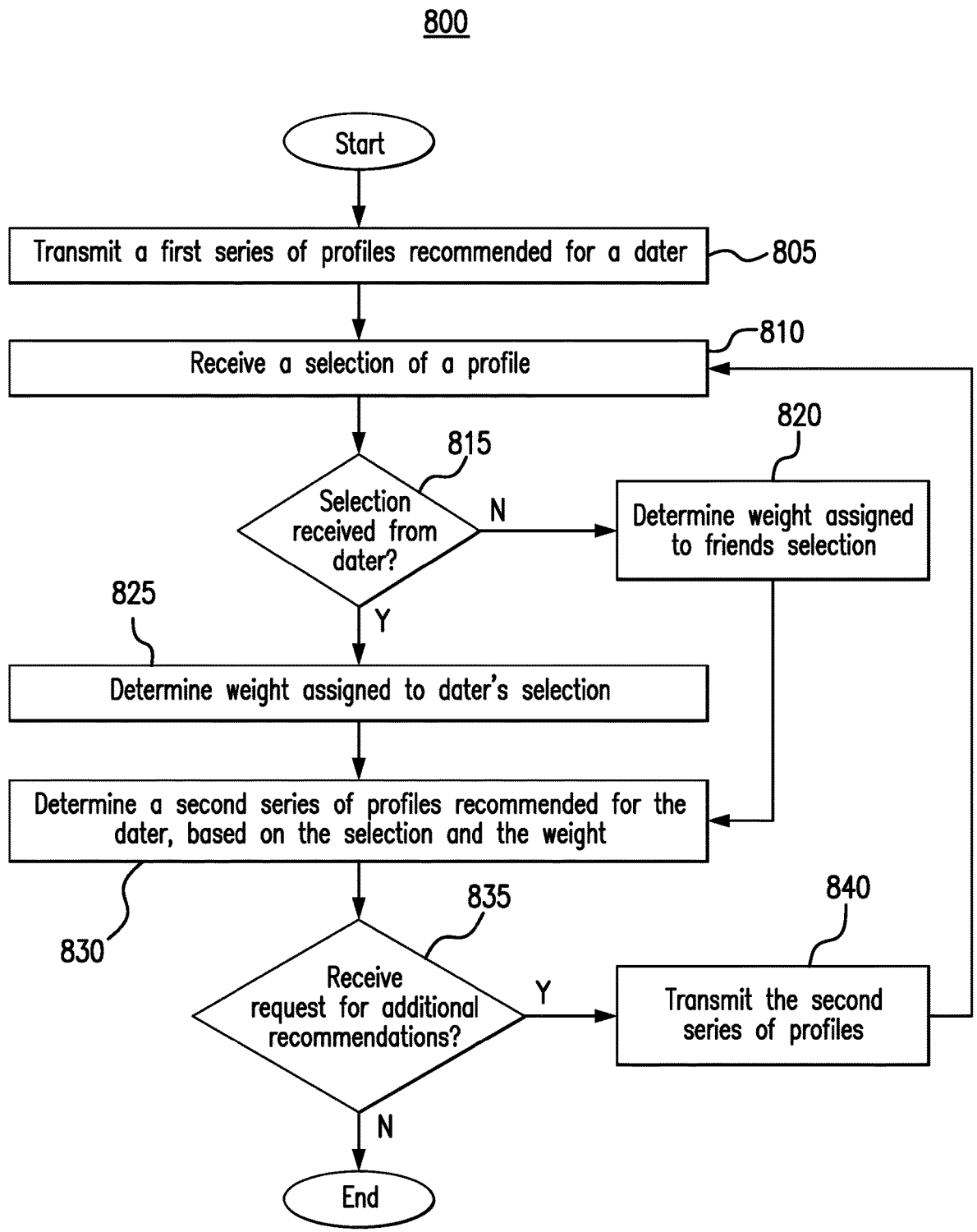
FIG. 8 presents a flowchart illustrating an example method by which the matching tool of the system of FIG. 1 may generate recommendations of profiles belonging to users who are potentially compatible with a given dater registered with the tool.

FIG. 8 presents a flowchart illustrating the method by which matching tool 105 may generate recommendations of potentially compatible users 110 for a dater 110a.

In step 805 matching tool 105 transmits a first series of profile recommendations 310 to dater 110a, first friend 110b of dater 110a, and/or second friend 110f of dater 110a. In step 810 matching tool 105 receives a selection 315 of one or more profiles 130 presented in first series of profile recommendations 310. In step 815 matching tool 105 determines if selection 315 was received from dater 110a.

If, in step 815 matching tool 105 determines that selection 315 was received from dater 110a, in step 825 matching tool 105 determines weight 155a assigned to dater 110a. On the other hand, if, in step 815 matching tool 105 determines that selection 315 was received from first friend 110b or second friend 110f, in step 820 matching tool 105 determines weight 155b, assigned to first friend 110b, or weight 155f, assigned to second friend 110f. In step 830 matching tool 105 determines a second series of profile recommendations 320 for dater 110a, based at least in part on selection 315 and weight 155a, using matching algorithm 145. In step 835 matching tool 105 determines whether or not a request has been received from any of dater 110a, first friend 110b, and second friend 110f for additional profile recommendations. If, in step 835 matching tool 105 determines that a request has been received for additional profile recommendations, in step 840 matching tool 105 transmits second series of profile recommendations 320. Method 800 then proceeds to step 810 and continues from step 810 as described above.

Modifications, additions, or omissions may be made to method 800 depicted in FIG. 8. Method 800 may include more, fewer, or other steps. For example, steps may be performed in parallel or in any suitable order. While discussed as matching tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
an interface configured to send and receive data over a network;
a memory configured to store a permission, the permission indicating that a second user is allowed to suggest users to a first user; and
a hardware processor configured to:
transmit to the first user, using the interface, a set of recommended user profiles;
transmit to the second user, using the interface, a profile of a third user;
receive from the second user, using the interface, a selection of the profile of the third user;
assign a first weight value to the second user, the first weight value indicating an importance that a recommendation engine should give to recommendations from the second user; and
in response to receiving the selection of the profile of the third user:
update the set of recommended user profiles to include the profile of the third user;
reorder the updated set of recommended user profiles to set a position of the profile of the third user within the updated set of recommended user profiles based at least on the first weight value associated with the second user;
transmit to the first user, using the interface, the reordered set of recommended user profiles along with an indication that the profile of the third user has been selected by the second user for the first user;
generate a graphical user interface that displays the reordered set of recommended user profiles along with the indication, wherein:
the reordered set of recommended user profiles is represented by a set of graphical representations rearranged according to an order of the reordered recommended user profiles, each graphical representation of each user profile in the reordered set of recommended user profiles represents a respective user profile; and
the indication comprises a graphical representation that indicates the profile of the third user has been selected by the second user for the first user; and
enable communication between the first user and the third user.

2. The apparatus of claim 1, wherein the indication comprises an icon on the profile of the third user.

3. The apparatus of claim 1, wherein the indication comprises a statement that the second user suggests the third user for the first user.

4. The apparatus of claim 1, wherein the processor is further configured to transmit a set of profiles to the first user for selection, the profile of the third user being located at the beginning of the set of profiles.

5. The apparatus of claim 1, wherein the second user is a friend of the first user, and the third user is a potential dater for the first user.

6. The apparatus of claim 1, wherein the processor is further configured to:
receive from the first user, using the interface, a second selection of the profile of the third user;
receive, from the third user, using the interface, a selection of the profile of the first user;
in response to receiving, from the first user, the second selection of the profile of the third user and receiving, from the third user, the selection of the profile of the first user, enable communication between the first user and the third user.

7. The apparatus of claim 1, wherein the processor is further configured to, in response to receiving the selection of the profile of the third user:
place the profile of the third user in a list of suggestions for the first user; and
transmit, using the interface, the list of suggestions to the first user.

8. A method comprising:
storing, using a memory, a permission, the permission indicating that a second user is allowed to suggest users to a first user;
transmitting to the first user, using an interface, a set of recommended user profiles;
transmitting to the second user, using the interface, a profile of a third user;
receiving from the second user, using the interface, a selection of the profile of the third user;
assigning a first weight value to the second user, the first weight value indicating an importance that a recommendation engine should give to recommendations from the second user; and
in response to receiving the selection of the profile of the third user:
updating the set of recommended user profiles to include the profile of the third user;
reordering the updated set of recommended user profiles to set a position of the profile of the third user within the updated set of recommended user profiles based at least on the first weight value associated with the second user;
transmitting to the first user, using the interface, the reordered set of recommended user profiles along with an indication that the profile of the third user has been selected by the second user for the first user;
generating a graphical user interface that displays the reordered set of recommended user profiles along with the indication, wherein:
the reordered set of recommended user profiles is represented by a set of graphical representations rearranged according to an order of the reordered recommended user profiles, each graphical representation of each user profile in the reordered set of recommended user profiles represents a respective user profile; and
the indication comprises a graphical representation that indicates the profile of the third user has been selected by the second user for the first user; and
enabling communication between the first user and the third user.

9. The method of claim 8, wherein the indication comprises an icon on the profile of the third user.

10. The method of claim 8, wherein the indication comprises a statement that the second user suggests the third user for the first user.

11. The method of claim 8, wherein the processor is further configured to transmit a set of profiles to the first user for selection, the profile of the third user being located at the beginning of the set of profiles.

12. The method of claim 8, wherein the second user is a friend of the first user, and the third user is a potential dater for the first user.

13. The method of claim 8, further comprising:
receiving from the first user, using the interface, a second selection of the profile of the third user;
receiving, from the third user, using the interface, a selection of the profile of the first user;
in response to receiving, from the first user, the second selection of the profile of the third user and receiving, from the third user, the selection of the profile of the first user, enabling communication between the first user and the third user.

14. The method of claim 8, further comprising:
in response to receiving the selection of the profile of the third user:
place the profile of the third user in a list of suggestions for the first user; and
transmit, using the interface, the list of suggestions to the first user.

15. At least one non-transitory computer-readable medium comprising a plurality of instructions that, when executed by at least one processor, are configured to:
store a permission, the permission indicating that a second user is allowed to suggest users to a first user;
transmit to the first user, using an interface, a set of recommended user profiles;
transmit to the second user, using the interface, a profile of a third user;
receive from the second user, using the interface, a selection of the profile of the third user;
assign a first weight value to the second user, the first weight value indicating an importance that a recommendation engine should give to recommendations from the second user; and
in response to receiving the selection of the profile of the third user:
update the set of recommended user profiles to include the profile of the third user;
reorder the updated set of recommended user profiles to set a position of the profile of the third user within the updated set of recommended user profiles based at least on the first weight value associated with the second user;
transmit to the first user, using the interface, the reordered set of recommended user profiles along with an indication that the profile of the third user has been selected by the second user for the first user;
generate a graphical user interface that displays the reordered set of recommended user profiles along with the indication, wherein:
the reordered set of recommended user profiles is represented by a set of graphical representations rearranged according to an order of the reordered recommended user profiles, each graphical representation of each user profile in the reordered set of recommended user profiles represents a respective user profile; and
the indication comprises a graphical representation that indicates the profile of the third user has been selected by the second user for the first user; and
enable communication between the first user and the third user.

16. The at least one non-transitory computer-readable medium of claim 15, wherein the indication comprises an icon on the profile of the third user.

17. The at least one non-transitory computer-readable medium of claim 15, wherein the indication comprises a statement that the second user suggests the third user for the first user.

18. The at least one non-transitory computer-readable medium of claim 15, wherein the processor is further configured to transmit a set of profiles to the first user for selection, the profile of the third user being located at the beginning of the set of profiles.

19. The at least one non-transitory computer-readable medium of claim 15, wherein the second user is a friend of the first user, and the third user is a potential dater for the first user.

20. The at least one non-transitory computer-readable medium of claim 15, wherein the instructions are further configured to:
receive from the first user, using the interface, a second selection of the profile of the third user;
receive, from the third user, using the interface, a selection of the profile of the first user;
in response to receiving, from the first user, the second selection of the profile of the third user and receiving, from the third user, the selection of the profile of the first user, enable communication between the first user and the third user.

* * * * *